US006990293B2

(12) United States Patent
Hu

(10) Patent No.: US 6,990,293 B2
(45) Date of Patent: Jan. 24, 2006

(54) PICTURE CHANGER WITH RECORDING AND PLAYBACK CAPABILITY

(76) Inventor: Ron Hu, 2 Meadowlark Road, Gloucester, Ontario (CA) K1J8N8

( * ) Notice: Subject to any disclaimer, the term of this patent is extended or adjusted under 35 U.S.C. 154(b) by 22 days.

(21) Appl. No.: 10/471,812

(22) PCT Filed: Mar. 14, 2002

(86) PCT No.: PCT/CA02/00339

§ 371 (c)(1), (2), (4) Date: Sep. 12, 2003

(87) PCT Pub. No.: WO02/075452

PCT Pub. Date: Sep. 26, 2002

(65) Prior Publication Data

US 2004/0120018 A1 Jun. 24, 2004

Related U.S. Application Data

(63) Continuation-in-part of application No. 09/808,353, filed on Mar. 15, 2001, now abandoned.

(51) Int. Cl.
*G03B 17/24* (2006.01)

(52) U.S. Cl. ........................ 396/311; 396/429; 355/31; 40/455

(58) Field of Classification Search ................ 396/311, 396/312, 429; 355/31; 40/455, 508, 513
See application file for complete search history.

(56) References Cited

U.S. PATENT DOCUMENTS

| | | | | |
|---|---|---|---|---|
| 3,861,793 A | 1/1975 | Takeda et al. | ................ | 353/19 |
| 4,038,691 A | 7/1977 | Gerry | ............................ | 360/2 |
| 4,270,853 A | 6/1981 | Hatada et al. | ................ | 354/76 |
| 4,270,854 A | 6/1981 | Stemme et al. | ............... | 354/76 |
| 4,905,029 A | 2/1990 | Kelley | ......................... | 354/76 |
| 4,939,860 A | 7/1990 | Ackeret | ....................... | 40/513 |
| 4,983,996 A | 1/1991 | Kinoshita | .................... | 354/76 |
| 5,276,472 A | 1/1994 | Bell et al. | ...................... | 354/76 |
| 5,365,686 A | 11/1994 | Scott | ........................... | 40/455 |
| 5,521,663 A | 5/1996 | Norris, III | .................. | 354/106 |
| 5,574,519 A | 11/1996 | Manico et al. | .............. | 396/429 |
| 5,644,557 A | 7/1997 | Akamine et al. | ............. | 369/14 |
| 5,655,164 A | 8/1997 | Tsai | ........................... | 396/312 |
| 5,771,414 A | 6/1998 | Bowen | ....................... | 396/312 |

(Continued)

FOREIGN PATENT DOCUMENTS

EP 0139778 5/1985

(Continued)

*Primary Examiner*—David M. Gray
(74) *Attorney, Agent, or Firm*—Andrus, Sceales, Starke & Sawall, LLP

(57) ABSTRACT

A display apparatus (18) capable of sequentially displaying a plurality of annotated image prints (36), each image print having encoded audio data (54) made integral to its back surface (46), thereby providing a convenient way to both display image prints and play back audio data associated with image prints. In one aspect, the display apparatus (18) also records audio data for a plurality of image prints and provides a handwritten means to electronically associate a particular image print with its respective audio recording. In other aspects, the display apparatus (18) also includes means for integrating encoded data (54) with the image prints and recording, storing and playing back data corresponding to a portfolio of image prints. There is also a method of capturing images and corresponding audio messages, integrating the audio messages with the back surfaces (46) of image prints made from the images, and displaying the image prints while playing back the corresponding audio messages.

45 Claims, 18 Drawing Sheets

U.S. PATENT DOCUMENTS

| | | | | |
|---|---|---|---|---|
| 5,878,292 | A | 3/1999 | Bell et al. | 396/312 |
| 5,920,737 | A | 7/1999 | Marzen et al. | 396/312 |
| 5,995,193 | A | 11/1999 | Stephany et al. | 355/31 |
| 6,078,758 | A | 6/2000 | Patton et al. | 396/312 |
| 6,094,279 | A | 7/2000 | Soscia | 358/1.9 |
| 6,163,656 | A * | 12/2000 | Yoshioka | 396/429 |
| 6,322,181 | B1 | 11/2001 | Silverbrook | 347/2 |
| 6,561,429 | B2 | 5/2003 | Bryant et al. | 235/462.43 |

FOREIGN PATENT DOCUMENTS

| | | |
|---|---|---|
| EP | 0139779 | 5/1985 |
| JP | 10111638 | 4/1998 |

* cited by examiner

PICTURE CHANGER WITH RECORDING AND PLAYBACK CAPABILITY

CROSS REFERENCE TO RELATED APPLICATION

The present application is the U.S. national stage application of International Application PCT/CA02/00339, filed Mar. 14, 2002, which international application was published on Sep. 26, 2002 as International Publication WO 02/075452. The International Application claims priority on and is a Continuation-In-Part of U.S. patent application Ser. No. 09/808,353, filed Mar. 15, 2001, now abandoned.

This invention relates to a method and apparatus for displaying image prints and for recording and playback of annotation where such annotation is made integral to the image prints.

BACKGROUND OF THE INVENTION

Image annotation is the process of adding supplemental information relating to an image print for the purpose of enhancing enjoyment or for future reference. As such, the ability to record and playback annotation relating to image prints has broad applications in many different fields. For example, in the field of photography, recording of one's own voice annotation that can later be played back enhances one's enjoyment and memory recollection of the events surrounding the photos. In the field of tourism, post cards that can bear audio narration can serve as a tour guide of the places to visit and memorabilia to keep afterwards. In the field of children's education, picture cards that can narrate their story lines provide a fun way for children to learn reading skills.

There have been various past attempts to record and playback annotation on traditional photographic prints. Numerous prior art references teach the use of a separate storage medium such as magnetic disc; tape, electronic memory element or optical memory element to hold sound information. The sound information is then logically associated with the photographic prints through a specialized album or display apparatus. The disadvantage of this approach is that the sound storage media can become easily disassociated with the photographic prints through handling. The storage media is also susceptible to being physically lost, destroyed or erased. Other prior art references teach integrating sound information with the image prints. This approach eliminates the risk of separation and mix-up of audio information from the image prints, and is the subject of the following discussion.

Within this approach, various methods of integrating magnetic, semiconductor and optical memory containing sound information with the image print are found in the prior art. In addition, a number of prior art references teach the use of optical encoding directly on a media without the use of a separate storage means. Some of the prior art disclosing the magnetic methods of storage are as follows:

In U.S. Pat. No. 4,270,854 issued to Stemme, et al. on Jun. 2, 1981, sound is recorded on an instant print by placing the print, after it has been ejected, into an auxiliary slot in the camera and then proceeding to record the audio on a magnetic strip integral to the print border. The only method disclosed for playback is with the camera.

Similarly, in U.S. Pat. No. 4,905,029 issued to Kelly on Feb. 27, 1990, sound is recorded using a magnetic strip which is either integrally formed with instant print material or is separable for later attachment. It provides a limited audio storage space and is awkward to reproduce the sound while viewing the print. It requires a magnetic reader head employing relative motion between the head and magnetic strip for signal reproduction. This system is prone to mechanical failure.

Also, U.S. Pat. No. 5,920,737 issued to Marzen et al. on Jul. 6, 1999 discloses an apparatus that has a recording/applicator mechanism which applies a recorded magnetic tape strip to photographs automatically when the photograph is positioned within the applicator mechanism. Unfortunately, all such magnetic recording media have a limited life span that includes inherent loss of the magnetically recorded data over time.

Some other prior art references disclosing the semiconductor memory methods are as follows:

U.S. Pat. No. 5,365,686 to Scott, issued Nov. 22, 1994, shows a U-shaped plastic sleeve for holding a photograph, which sleeve includes an integral IC memory chip into which audio data can be recorded and from which it can be retrieved. The sleeve can be "plugged in" to a player whereby electrical contact is made with the player. This system has the disadvantage of added cost and bulk to the image prints.

Also, U.S. Pat. No. 5,878,292 to Bell et al, issued on Mar. 2, 1999, discloses the method of making of an image-audio print whereby the image print is adhesively attached to a backing containing audio storage means such as EPROM or EEPROM. When such image-audio print is inserted into a player, it makes electrical contact with the player's apparatus and thereby plays back the message stored in the integral audio storage. According to the invention, this backing material adds "heft" to the print. For many people, this added heft may be undesirable.

Still some of the other prior art references disclosing the optical methods are as follows:

U.S. Pat. No. 4,983,996 discloses a camera having a microphone which optically records sound data in a bar code pattern along the border of the film. The camera is provided with a detachably connectable bar code reader which is used, once the film is developed and printed, to scan the code along the print border to play the voice or sound recording associated with the print. This system provides for a limited amount of sound recording.

Also, U.S. Pat. No. 5,276,472, issued to Bell et al on Jan. 4, 1994, describes a sound capturing camera that first stores a sound record onto a transparent magnetic coating on the film. This sound record is then transferred to the back of a print with an ink jet printer or thermally formed blisters or writing the sound record as a bar code on the area adjacent to an image on the front of the print. A hand-held device is used on the print to read the sound record from the print and play back the sound record. This system requires writing the entire sound record on the print and in one case, proposes creating an unsightly pattern bearing the sound record adjacent to the image on the print.

U.S. Pat. No. 5,521,663, granted to Norris on May 28, 1996, discloses recording sound by the camera directly onto the film using a latent image binary code. The binary code is imaged onto the print at the time the print is exposed. The code is decoded into sound by a scanner in the playback device. This system uses up valuable image area on the image print for the sound code.

Further, U.S. Pat. No. 5,995,193 issued to Stephany et al on Nov. 30, 1999, discloses a self-contained device for recording and playback of data on a medium such as photographic print. The recording can be done in either or both visible and invisible ink and playback can detect either or both visible and invisible ink. A print is inserted into the device for recording and playback. This device is not suitable for portable enjoyment of sound reproduction.

Similarly, U.S. Pat. No. 6,094,279 to Soscia, issued Jul. 25, 2000, discloses the use of a printed invisible encodement on a photographic image to record sound information. The invisible image is produced by development of a photographic emulsion layer, inkjet printing, thermal dye transfer printing or other printing method. The encodement is a one or two-dimensional array of encoded data. This approach requires printing on the face of the photographic prints, and to avoid problems, the materials used, including materials in the layers of the photographs, are selected to avoid undesirable interactions. This is acceptable for new prints, but is difficult to adapt for existing prints. It is also likely that for many people, subjecting valued photographs to an elective modification, thus risking even a small chance of damage or loss, is unacceptable.

From the above, it is clear that there is a desire to associate sound and other data with print images. Unfortunately, as indicated above, each of the aforementioned systems has one or more disadvantages.

BRIEF SUMMARY OF THE INVENTION

Briefly summarized, a general object of one preferred aspect of the present invention is to overcome the above shortcomings by providing an apparatus and method for displaying image prints and playing back annotation that has been integrated on a back surface thereof.

An object of another preferred aspect of the present invention is to provide an apparatus and method for recording and associating annotation with a corresponding image print and for playing back the annotation when the corresponding image print is displayed.

An object of yet another preferred aspect of the invention is to provide a method of encoding annotation related to an image print and integrating the annotation in the form of a two-dimensional encodement format with the back surface of the image print.

An object of a further preferred aspect of the present invention is to provide an apparatus and method for recording annotation associated with image prints, integrating the annotation with the back surface of a corresponding image print, and displaying the image print while playing back the corresponding annotation.

An object of another preferred aspect of the present invention is to provide a method of capturing images and audio messages corresponding to the images, integrating the audio messages with image prints made from the images; and displaying the image prints while playing back the corresponding audio messages.

An object of yet another preferred aspect of the present invention is to provide an apparatus and method for recording, storing and playing back data corresponding to a portfolio of image prints.

An object of other preferred embodiments of the present invention is make the apparatus portable, self-contained and battery operated.

In accordance with one preferred aspect of the present invention then, there is provided a display apparatus including display means for holding a plurality of image prints and for displaying the image prints successively in a viewing aperture, and advance means for sequentially advancing the image prints one at a time to the viewing aperture, comprising: scanning means for scanning a machine-readable data on a back surface of at least one of the plurality of image prints, the machine-readable data being integral to the back surface of the at least one image print; decoding means for decoding the machine-readable data wherein the machine-readable data comprises audio data, machine data, or text data; storage means for storing the decoded machine-readable data corresponding to the at least one scanned image print; and playback means for playing back from the storage means the decoded machine-readable data corresponding to the at least one scanned image print when the at least one scanned image print is displayed at the viewing aperture, whereby the display apparatus is convenient for both displaying image prints and for playing back the corresponding decoded machine-readable data.

In accordance with another preferred aspect of the present invention, there is provided a display apparatus comprising display means for holding a plurality of image prints and for displaying the image prints successively in a viewing aperture, and advance means for sequentially advancing the image prints one at a time to the viewing aperture, comprising: scanning means for scanning a handwritten indicia on the back surface of at least one of the plurality of image prints; decoding means for decoding the scanned indicia wherein the indicia contains identification information unique to the at least one scanned image print; recording means for recording audio corresponding to the at least one scanned image print, storage means for storing the recorded audio corresponding to the at least one scanned image print at a unique storage location uniquely associated with the identification information; playback means for playing back from the unique storage location the recorded audio corresponding to the at least one scanned image print when the at least one scanned image print is displayed at the viewing aperture, whereby the indicia provides a means to correspond the at least one image print with the corresponding audio recording, and whereby the display apparatus is convenient for both displaying image prints and playing back audio associated with the image prints.

A method for sequentially displaying a stack of image prints in a display apparatus, comprising the steps of: placing the stack of image prints into the display apparatus; scanning a machine-readable data from a back surface of a bottom-most stacked image print wherein the machine-readable data comprises audio data, machine data, or text data, and wherein the machine-readable data is integral to the back surface of the bottom-most stacked image print; decoding the scanned machine-readable data corresponding to the bottom-most stacked image print and storing the scanned machine-readable data corresponding to the bottom-most stacked image print in a storage means; advancing the bottom-most stacked image print to a top-most position of the stack and into a viewing aperture; playing back the decoded scanned machine-readable data stored in the storage means corresponding to the top-most stacked image print displayed in the viewing aperture, whereby the display apparatus is convenient for both displaying image prints and playing back the machine-readable data associated with the image prints.

A method of sequentially displaying a stack of image prints in a display apparatus, comprising the steps of: placing the stack of image prints into the display apparatus; scanning a handwritten indicia on a back surface of a bottom-most print; decoding the scanned indicia wherein the indicia contains identification information unique to the bottom-most stacked image print, advancing the bottom-most stacked image print to a top-most position of the stack and into a viewing aperture; recording an audio corresponding to the top-most stacked image print; storing the recorded audio corresponding to the top-most stacked image print in a storage means at a storage location uniquely associated with the identification information corresponding to the top-most stacked image print; playing back from the storage means the recorded audio corresponding to the top-most stacked image print displayed at the viewing aperture of the display apparatus, whereby the indicia provides a means to correspond the top-most stacked image print with the corresponding audio recording, and whereby the display apparatus is convenient for both displaying image prints and playing back audio associated with the image prints.

A method of recording a machine-readable data on a back surface of an image print, the machine-readable data representative of an audio recording corresponding to the image print, comprising the steps of: outputting the audio recording from a display apparatus used to record the audio recording; converting the audio recording into the machine-readable data using an algorithmic encoding process, wherein the machine-readable data is a two-dimensional encodement format; printing the machine-readable data using a printing device and integrating the machine-readable data with the back surface of the corresponding image print, whereby the audio recording is made integral to the image print.

An annotation and display apparatus, comprising: display means for holding a plurality of image prints and for displaying the image prints successively in a viewing aperture; advance means for sequentially advancing the image prints one at a time to the viewing aperture; recording means for recording an audio message corresponding to at least one of the image prints; encoding means for encoding the recorded audio message into a machine-readable data; imprinting means for imprinting the machine-readable data and integrating the machine-readable data on a back surface of the at least one image print; scanning means for scanning the machine-readable data integral on the back surface of the at least one image print; decoding means for decoding the machine-readable data into a decoded audio message corresponding to the at least one image print; playback means for playing back the decoded audio message when the at least one image print is displayed in the viewing aperture of the display apparatus whereby the display apparatus is convenient for displaying image prints and for imprinting and playing back the corresponding decoded audio messages.

A method of annotating and displaying image prints using a display apparatus comprising the steps of: recording an audio message corresponding to at least one of the image prints; encoding the recorded audio message into a machine-readable data; imprinting the machine-readable data using an imprinter attached to the display apparatus, and integrating the machine-readable data on a back surface of the at least one image print; scanning the machine-readable data integral on the back surface of the at least one image print; decoding the machine-readable data into a decoded audio message corresponding to the at least one image print; displaying the at least one image print in a viewing aperture of the display apparatus; and playing back the decoded audio message corresponding to the displayed image print, whereby the recorded audio message is made integral to the back surface of the at least one image print and is played back while the at least one image print is displayed in the display apparatus.

A method for combining images with corresponding audio messages and for displaying the images and playing back the corresponding audio messages in a display apparatus comprising the steps of: capturing at least one the image using a camera, the camera also capable of recording the corresponding audio messages; using the camera to record at least one the corresponding audio message for the at least one image in a storage medium; producing an image print from the at least one captured image; encoding the at least one recorded corresponding audio message stored in the storage medium into a machine-readable data; imprinting the machine-readable data and integrating the machine-readable data on a back surface of the image print; scanning the machine-readable data integral on the back surface of the image print; decoding the machine-readable data into a decoded audio message corresponding to the image print; displaying the image print in a viewing aperture of the display apparatus; and playing back the decoded audio message corresponding to the displayed image print, whereby the at least one recorded audio message made while capturing the at least one image is made integral to the back surface of the corresponding image print and is played back while the image print is displayed in the display apparatus.

A portfolio annotation apparatus, comprising: a detachable cassette for holding image prints, the cassette and the image prints comprising a portfolio; a portfolio recording means for recording data characterizing the portfolio, wherein the data comprises audio data, machine data, or text data; a storage means attached to the cassette for storing the data; and a portfolio playback means for playing back from the storage means the data characterizing the portfolio; whereby the cassette is a convenient means for organizing and categorizing image prints and the portfolio recording means is a convenient way to characterize the content of the portfolio for storage and later playback.

A method of annotating a portfolio of image prints comprising the steps of: placing at least one image print into a detachable cassette, the at least one image print and the cassette comprising the portfolio; placing the portfolio into an apparatus, the apparatus having recording and playback means; recording data corresponding to the portfolio, wherein the data comprise audio data, machine data, or text data; storing the data in a storage element attached to the cassette; and playing back from the storage element the data corresponding to the portfolio; whereby using the detachable cassettes is a convenient way to organize and categorize image prints into the portfolios, and recording data corresponding to the portfolios is a convenient way to characterize the content of the portfolios for storage and later playback.

Several advantageous features of the preferred embodiments of the present invention are as follows:

(a) the apparatus and method for annotating photographic prints is compatible with both existing and newly processed prints;

(b) the apparatus and method for annotating a photographic print provides annotation that is made integral to the print thereby precluding the annotation from becoming separated from the print;

(c) the apparatus and method of annotating a photographic print produces no obtrusive markings on the image surface of the print during the annotation process so as to avoid detracting from enjoyment of the image;

(d) the apparatus and method for annotating a photographic print produces annotation that will last as long as the photographic print itself and not be degraded significantly with use or over time, nor be subject to accidental erasure;

(e) the annotation produced on photographic prints is retrieved through non-contact means so as to avoid physical degradation of the prints or the annotation;

(f) the apparatus will make available, for audio annotation on photographic prints, at least 10 seconds of recording per photographic print;

(g) the apparatus holds a plurality of photographic prints which, when actuated by a user, displays each print successively while playing back annotation associated with the particular print, thereby enhancing the viewing enjoyment of each print;

(h) the apparatus for retrieving annotation on photographic prints that is portable and battery operated;

(i) the apparatus includes means for recording annotation corresponding to photographic prints and for storing the recorded annotation along with the corresponding prints within the apparatus;

(j) the apparatus includes a detachable storage element which holds stored annotation;

(k) the method and apparatus include means whereby the ordinary user can annotate photographic prints at home without need of any elaborate equipment;

(l) the method and apparatus include means for annotating photographic prints with human readable information;

(m) the method and apparatus include means whereby the annotation on a photographic print is retrievable even when the prints are mounted in a photo album;

(n) the apparatus is capable of generating synthesized speech thereby allowing playback of annotation comprising longer audio messages than digitized audio;

(o) the apparatus is capable of transferring annotation data to an external device;

(p) the apparatus is further capable of interacting with a user through a touch screen; and (q) the apparatus is also capable of electronically displaying information to a user.

Further advantages of preferred embodiments of the present invention are as follows:

(a) a system is provided that is compatible with commercially available image printing devices, thus obviating the need for the development and manufacture of specialized printing machinery;

(b) the apparatus for displaying photographic prints and playing back annotation on those prints that is durable and reliable;

(c) the apparatus and method for annotation photographic prints and playing back said annotation is inexpensive to manufacture, and accordingly will sell at a low price, thereby making such photograph annotation and display apparatus economically available to the average consumer.

Further objects and advantages of the present invention will be apparent from the following description and the appended drawings, wherein preferred embodiments of the invention are clearly described and shown.

BRIEF DESCRIPTION OF THE DRAWINGS

The present invention will be further understood from the following description with reference to the drawings in which.

Figure 1:
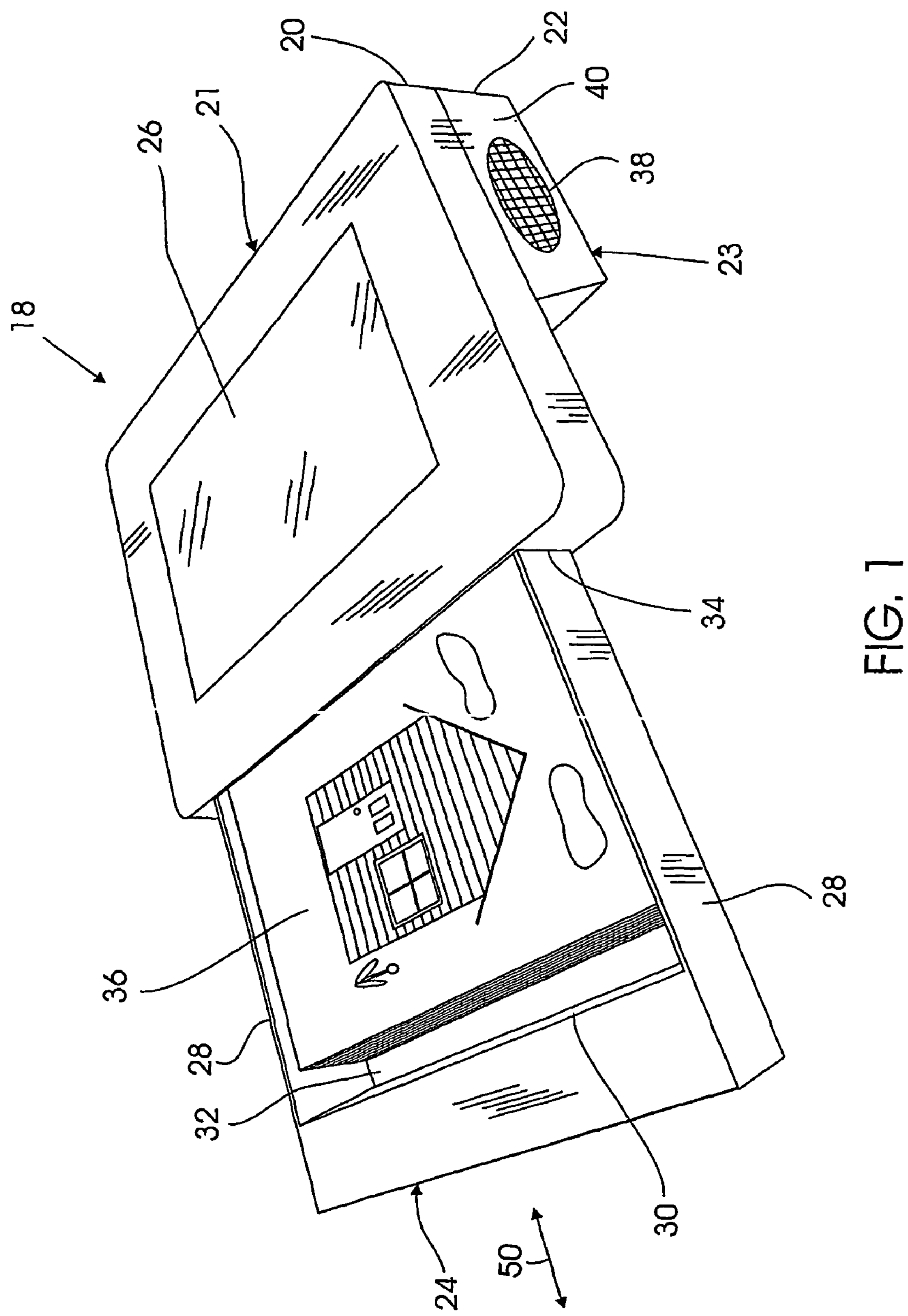
FIG. 1 is a perspective view of the display apparatus of a preferred embodiment of the present invention, facing up with the drawer fully open.

| REFERENCE NUMERALS SHOWN IN DRAWINGS | |
|---|---|
| 18 | display apparatus |
| 20 | frame housing |
| 21 | print holder |
| 22 | controller housing |
| 23 | controller |
| 24 | sliding drawer |
| 26 | viewing aperture |
| 28 | side walls |
| 30 | front wall |
| 32 | floor |
| 33 | opening in the floor |
| 34 | slot |
| 36 | a stack or portfolio of image prints |
| 38 | loudspeaker |
| 40 | supporting surface |
| 41 | separator bar |
| 42 | drawer switch |
| 43 | actuating lever |
| 46 | a back surface of an image print |
| 48 | the bottom-most image print |
| 49 | the top-most image print |
| 52 | scanning window |
| 54 | encoded data |
| 56 | mirror |
| 58 | image sensor |
| 59 | illuminator |
| 60 | optical path |
| 61 | optical path |
| 66 | human readable information |
| 72 | processor |
| 74 | nonvolatile memory |
| 76 | random access memory |
| 77 | read-only memory |
| 78 | audio amplifier |
| 80 | digital signal processor |
| 82 | batteries |
| 90 | microphone |
| 92 | record switch |
| 94 | transceiver |
| 96 | data connector |
| 100 | picture ID (PID) |

-continued

| REFERENCE NUMERALS SHOWN IN DRAWINGS | |
|---|---|
| 110 | routine to process PID information |
| 112 | routine to perform audio recording |
| 115 | micro printer |
| 120 | sliding drawer handle |
| 124 | input slot |
| 126 | output slot |
| 130 | an image print |
| 134 | portfolio recording switch |
| 140 | memory slot |
| 142 | storage element |
| 144 | label |
| 224 | detachable cassette |
| 44, 50, 132, 133, 150 | arrows |

GLOSSARY

The following are definitions of terms used in the ensuing description and are provided to aid in understanding the applicant's invention.

IMAGE PRINT: The most common form being a photographic print, but may also be any printed sheet from which a visual image can be perceived, such as post cards, picture cards, flash cards, drawings, letterings and the like.

ANNOTATION: Information related to an IMAGE PRINT. Annotation may comprise human readable information and machine-readable data. Human readable information may comprise text, handwritings, drawings and the like. Machine-readable data, embodied in a storage means, may comprise sound data, machine data, text data and the like. Sound, data may comprise human speech, voice, singing, music, animal noises, synthesized speech, synthesized sounds and the like. Machine data may comprise binary data, machine instructions and the like.

AUDIO DATA: Sound data that is digitized and compressed for digital storage and transmission.

ENCODED DATA: machine-readable data embodied in a two-dimensional symbology and printed on a sheet.

The following descriptions of the embodiments of the present invention refer to various conventions such as "top", "bottom", "uppers", "lower", "under", "underside", etc. These descriptors are made only to provide a frame of reference and should not limit the description provided herein. Although the present invention references image prints as photographic prints, and annotation as human speech or voice, it should be understood that other forms of image print and annotation as described in the Glossary definitions contained herein can be utilized with the present invention.

DETAILED DESCRIPTION OF THE PREFERRED EMBODIMENTS OF THE INVENTION

Description of a First Preferred Embodiment—FIGS. 1 to 6

With reference to FIGS. 1 to 6, a first preferred embodiment of the present invention will be described in detail as this will facilitate the understanding of further preferred embodiments described later.

Referring to FIG. 1, a display apparatus 18 comprises two main parts, a print holder 21 and a controller 23. The print holder 21 comprises a frame housing 20 with a viewing aperture 26 made of a clear or transparent plastic material and a sliding drawer 24 which is slidably engageable within frame housing 20. Sliding drawer 24 is preferably a one-piece element having a floor 32, a pair of side walls 28, a front wall 30 joining side walls 28 and a separator bar 41 (shown in FIG. 3) which altogether form a drawer-like structure. Sliding drawer 24 is made to be slidably engageable within a defined slot 34 in frame housing 20 in the directions shown by an arrow 50. Sliding drawer 24 can be pulled out of frame housing 20 for a distance limited by stop members (not shown) on separator bar 41 and complementary stop members (not shown) on frame housing 20. Sliding drawer 24 is sized for receiving and supporting a stack of image prints 36 arranged therein for display through viewing aperture 26. Viewing aperture 26, is made with clear or transparent plastic material, and is sized to display the individual image prints from the stack of image prints 36. Additional details relating to the structure of frame housing 20 and sliding drawer 24 are described in greater detail in U.S. Pat. No. 4,939,860, issued to P. Ackeret and assigned to Licinvist, A G which is hereby incorporated by reference. Controller 23 comprises a controller housing 22 and parts contained therein. An audio loudspeaker 38 attaches to an exterior supporting surface 40 of controller housing 22. Controller housing 22 attaches to the bottom of frame housing 20. Both frame housing 20 and controller housing 22 are preferably formed from injection-molded plastic.

Figure 2A:
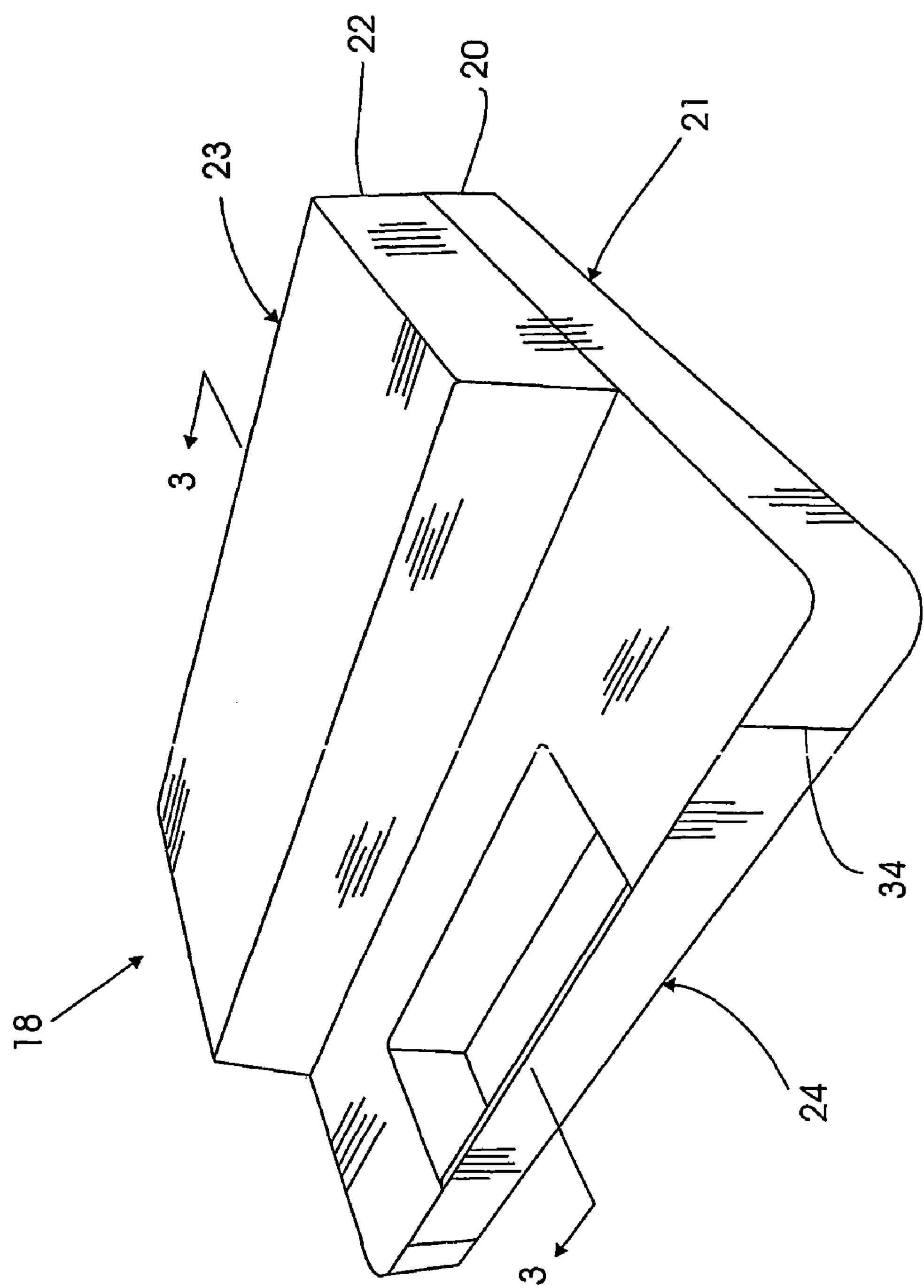
FIG. 2A is a perspective view of the apparatus shown in FIG. 1, facing down with the drawer fully closed.
Figure 2B:
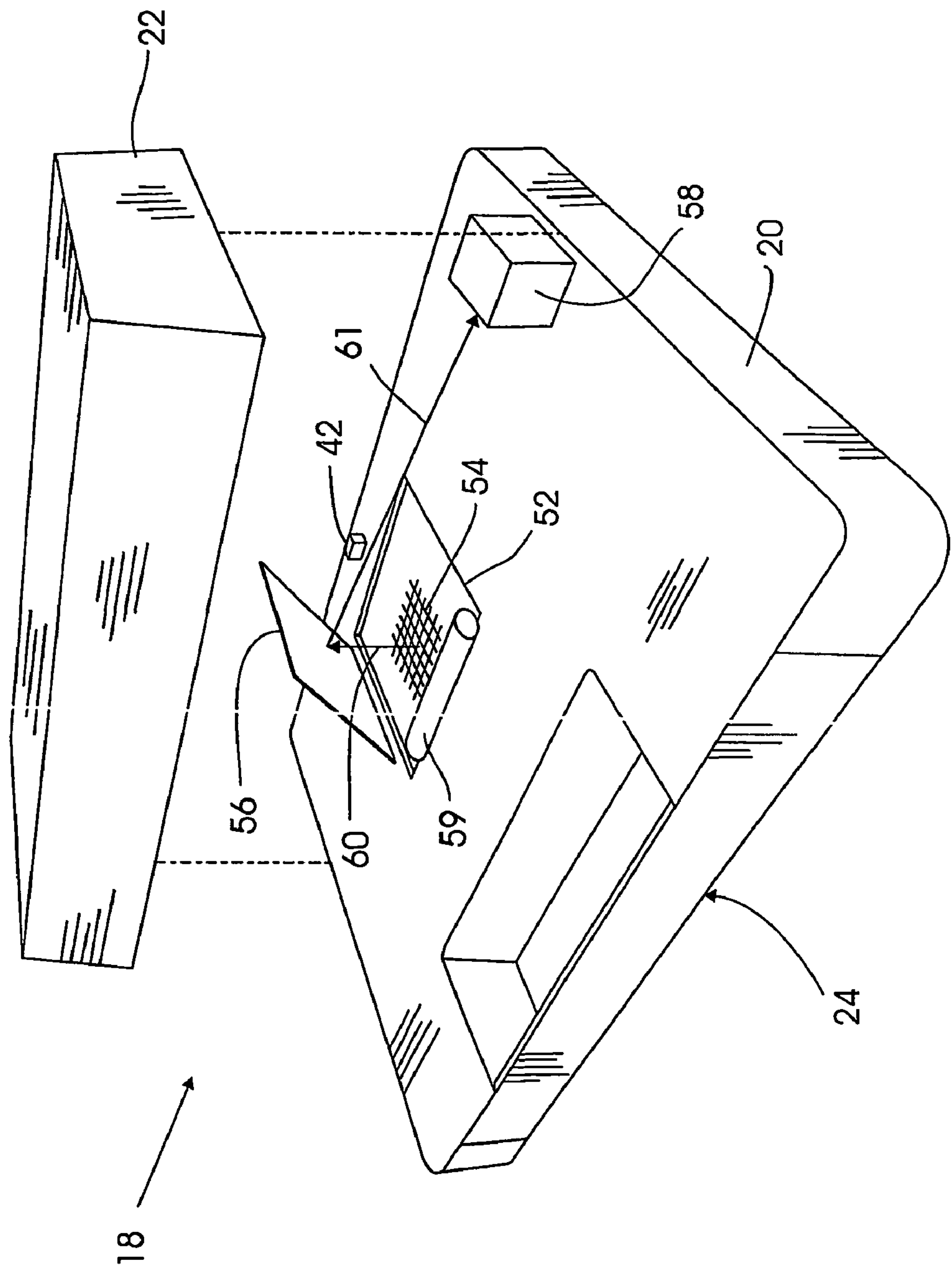
FIG. 2B is the display apparatus shown in FIG. 2A with the controller housing separated from the frame housing.

FIG. 2A is an underside view of display apparatus 18, showing controller 23, controller housing 22, print holder 21, frame housing 20, sliding drawer 24 in a fully closed position, and slot 34 in frame housing 20. FIG. 2B shows display apparatus 18 of FIG. 2A with controller housing 22 separated to expose optical related components contained therein. The optical components contained in controller housing 22 include an image sensor 58, a mirror 56 fixed at a predetermined angle and positioned above a scanning window 52, an illuminator 59 at one edge of scanning window 52, and another identical illuminator (not shown for simplification) at an opposite edge of scanning window 52. Image sensor 58 comprises a solid-state sensor and a predetermined lens to attain focus and a substantially full-image view of an encoded data 54 along an optical path 60, 61. Mirror 56 is a front-surface or first-surface type to minimize light loss and secondary refraction. Illuminator 59 comprises a bank of light-emitting diodes (LEDs) mounted in close proximity to each other so as to cast a uniform illumination on encoded data 54 on a back surface 46 (see FIG. 3) of a bottom-most image print 48. Alternatively, illuminator 59 may be any other light emitting devices capable of illuminating encoded data 54. A drawer switch 42 is positioned to sense the opening and closing of sliding drawer 24.

Mirror 56 is used to keep the profile or the thickness of display apparatus 18 to a minimum so it can be grasped easily with one hand, Without mirror 56, image sensor 58 would need to be located directly behind scanning window 52 at a distance equal to optical paths 60, 61. An alternative means of achieving a low profile is to use a linearly translating scanning mechanism (not shown) directly above scanning window 52 to perform the function of image scanning. Such a linear translating scanning mechanism can be based on the same principle as those found in desktop flatbed scanners, utilizing a charge-couple device (CCD) sensor or contact image sensor (CIS) mounted on a motorized moving carriage (not shown). Motorization of the carriage would not be required if the carriage is affixed (not shown) to sliding drawer 24 such that the action of pullingout/pushing-in sliding drawer 24 by the user achieves the linear translating motion necessary for scanning. These techniques of scanning are conventionally known to those skilled in the art. In a further alternative, image sensor 58 can be located in close proximity to scanning window 52 through the use of a wide-angle lens (not shown). A wide-angle lens can introduce spherical distortion, however, appropriate use of mathematical algorithms known in the art, can correct for such distortion.

Figure 3:
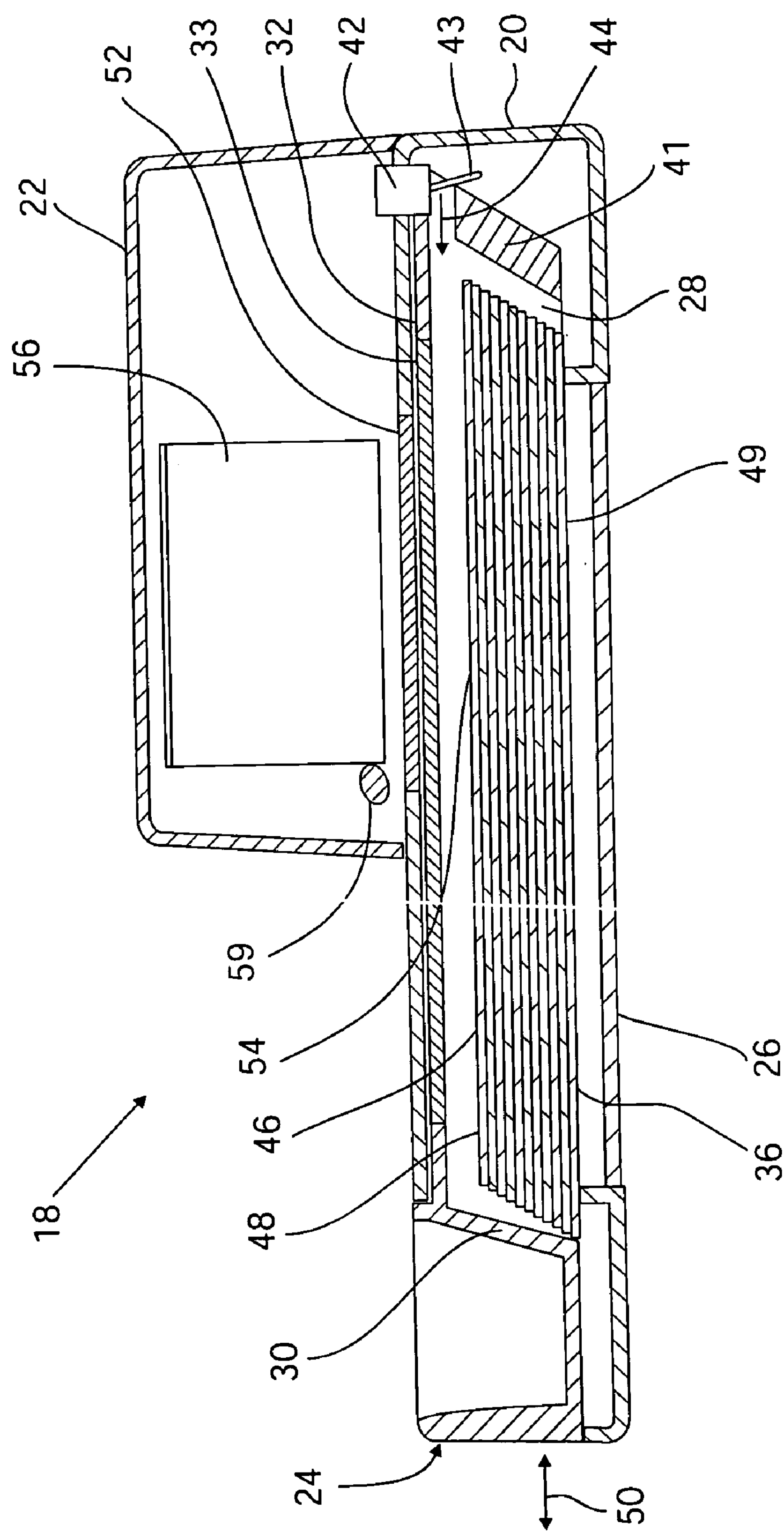
FIG. 3 is a cross-sectional view of the display apparatus shown in FIG. 2A along line 3—3.

FIG. 3 shows a cross-sectional view of display apparatus 18 along line 3—3 of FIG. 2A. In this face down view, sliding drawer 24 is fully engaged within frame housing 20. While in this position, separator bar 41, which forms the innermost part of the drawer-like structure, engages an actuating lever 43 of drawer switch 42. Actuating lever 43 is spring-loaded against separator bar 41 in the direction shown by an arrow 44. With sliding drawer 24 fully engaged within frame housing 20 as shown in FIG. 3, drawer switch 42 is electrically open. When sliding drawer 24 is disengaged from frame housing 20 as shown in FIG. 1, drawer switch 42 is electrically closed, or activated. The stack of image prints 36 is loaded within sliding drawer 24. A top-most image print 49 is visible through viewing aperture 26. Encoded data 54 imprinted on back surface 46 of bottom-most image print 48 is exposed to mirror 56 through an opening 33 in floor 32 of sliding drawer 24 and through scanning window 52. Controller housing 22, which is attached to the underside of frame housing 20 holds front-surface mirror 56 at a predetermined angle.

In summary, the optical elements described herein allow an image of encoded data 54 to travel along optical path 60, 61, first through opening 33 in floor 32 of sliding drawer 24, then through scanning window 52, then reflecting off front-surface mirror 56 and finally striking image sensor 58.

Figure 4:
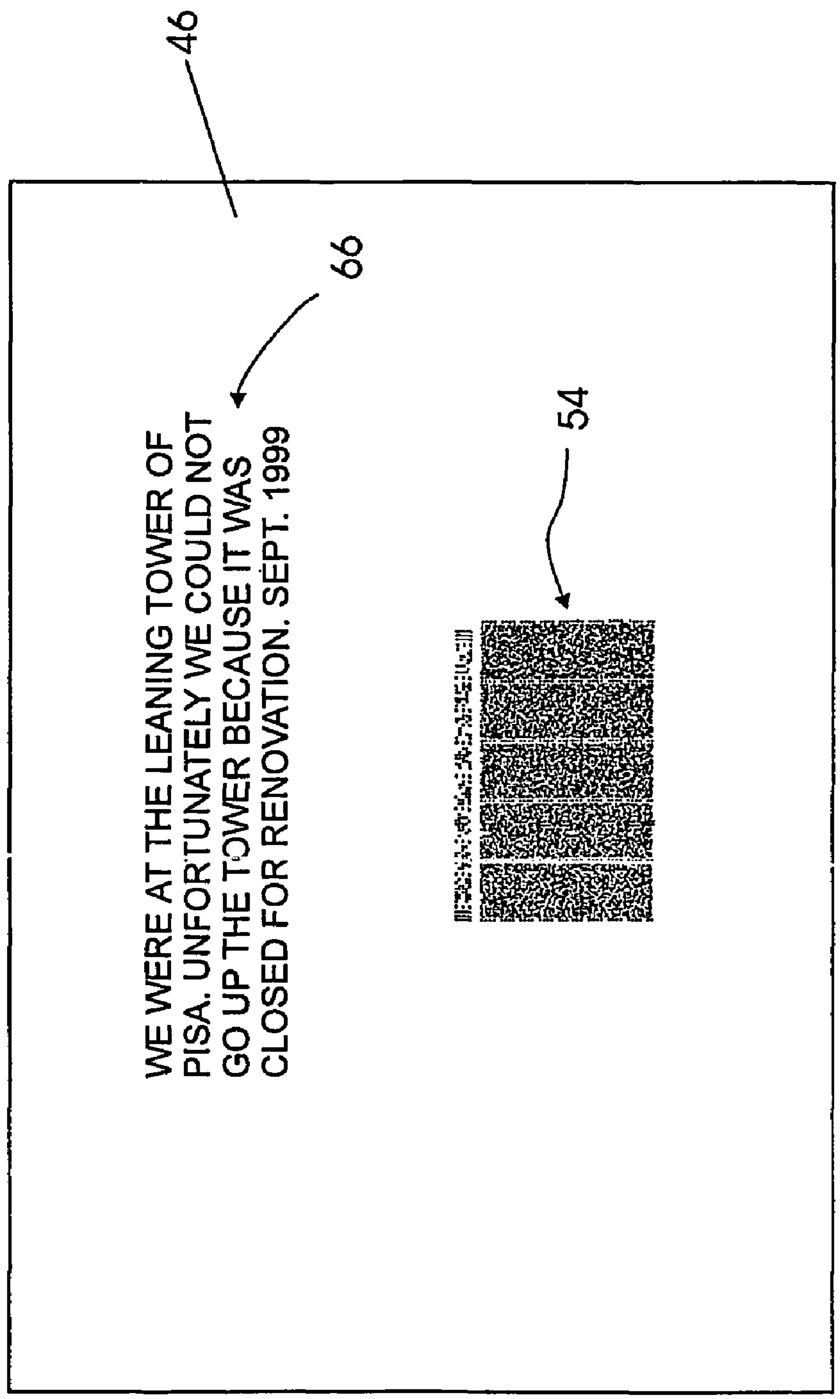
FIG. 4 is an exemplary representation of the back surface of an image print used in the display apparatus shown in FIG. 1.

FIG. 4 shows an exemplary imprinting on back surface 46 of an image print. A human readable information 66, along with encoded data 54 containing audio data, are disposed substantially in the same location on each image print of the stack of image prints 36. More specifically, encoded data 54 is located on the image print where it will be substantially centered within scanning window 52 when the image print is at the bottom of sliding drawer 24, and sliding drawer 24 is fully engaged within frame housing 20. The format of encoded data 54 may be any two-dimensional encodement having the capacity to hold digitized human speech as described in more detail below. Preferably, the encodement format is that of PaperDisk™ marketed by Cobblestone Software, Inc., of Lexington, Mass. An example of PaperDisk™ encodement format is shown by encoded data 54 in FIG. 4. Alternatively, two-dimensional high-density bar code formats may also be utilized such as Aztec Code, SuperCode, Data Matrix and QR Code which are conventionally known to those skilled in the art. In general, encoded data 54 holds at least 2,000 bytes, preferably at least about 4,000 bytes and most preferably at least about 6,000 bytes of digital information. The imprinting process may be done at the user's own premise using a computer, a printer and a predetermined software, or as a step in the photo finishing process of the photographic print by the photo finishing laboratory. Encoded data 54 is made integral to back surface 46 either by being imprinted directly on back surface 46 of an image print by a printing device (not shown) or by being imprinted on an adhesive label (not shown) first and then affixed to back surface 46 of an image print. Furthermore, while encoded data 54 can be visible or discernible by the naked eye, it need not be. Encoded data 54 may be imprinted with ink or dye that is either within or outside the visible wavelength range, where the visible wavelength is considered to be about 400 to about 700 nanometers. In such case, image sensor 58 will need to be responsive to the selected wavelengths and illuminator 59 must be chosen to excite the corresponding wavelengths.

Figure 5:
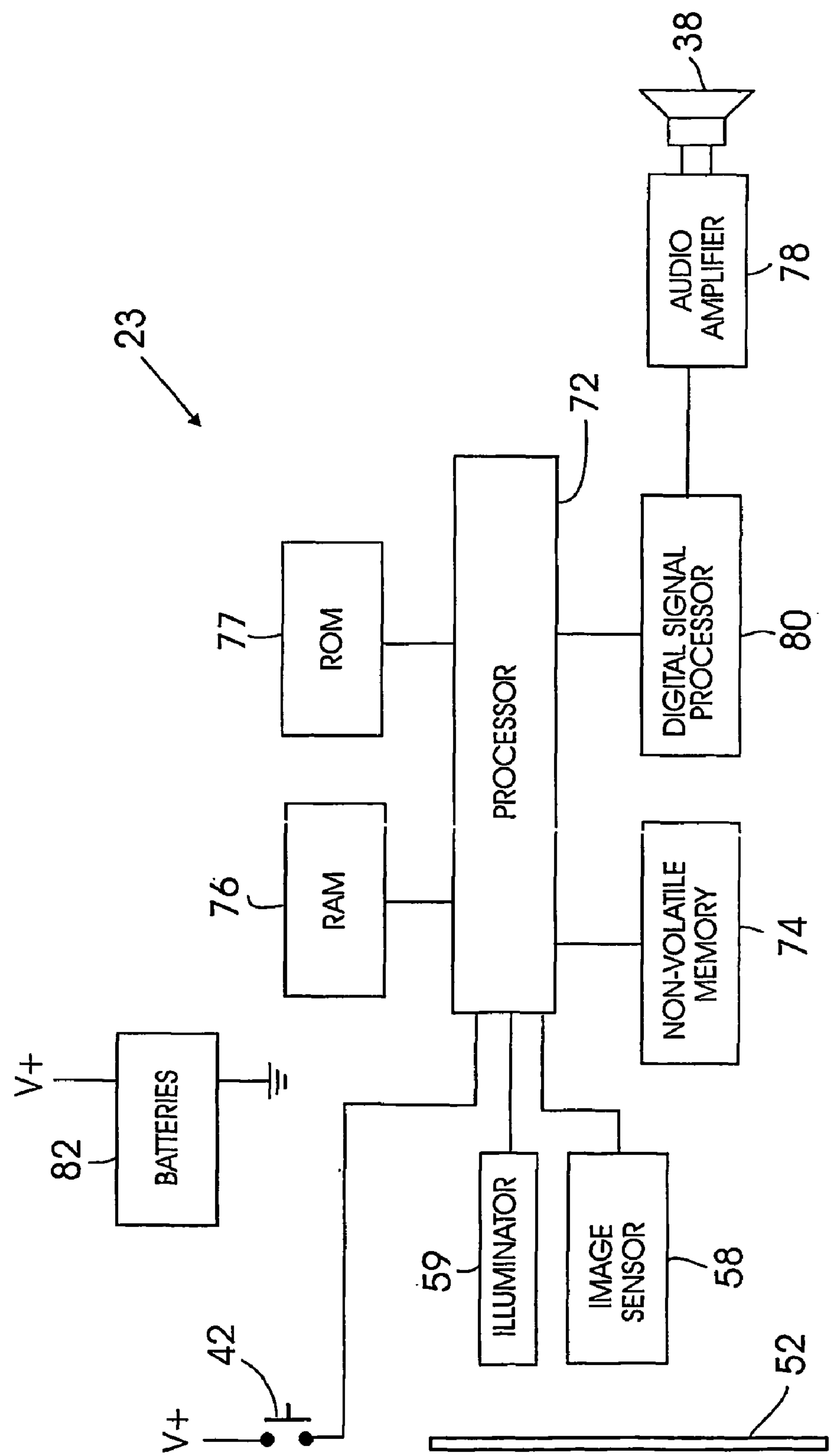
FIG. 5 is a block schematic diagram of the electrical subsystem of the display apparatus shown in FIG. 1.

FIG. 5 shows the main electrical components of controller 23 which are contained within controller housing 22. A power supply, in the form of batteries 82, supplies all the power to controller 23. A processor 72 coordinates the overall task of scanning, decoding and playing back of audio data. Preferably, processor 72 is a low-cost 8-bit or 16-bit microprocessor, and most preferably one of the family of 80C51 or its derivatives manufactured by Intel Corporation and others. Drawer switch 42, which is positioned to sense the opening and closing of sliding drawer 24, is interconnected to processor 72 to act as a power-up and start-up signal to processor 72 when activated. While deactivation of drawer switch 42 does not put processor 72 back into power-down mode, any re-activation of drawer switch 42 while processor 72 is powered on does force processor 72 to restart from the beginning.

A nonvolatile memory 74 provides the means to retain data when processor 72 goes into power-down mode. Two discrete memory areas are logically allocated within nonvolatile memory 74 for holding audio data associated with two particular image prints: an Area B (not shown) to hold audio data associated with the current bottom-most image print 48 (see FIG. 3), and an Area T (not shown) to hold audio data associated with the current top-most image print 49 (see FIG. 3). Top-most image print 49 is the print visible at viewing aperture 26. A random access memory (RAM) 76 provides temporary working memory for processor 72. Unlike nonvolatile memory 74, the content of random access memory 76 is lost when processor 72 goes into power-down mode. A read-only memory (ROM) 77 stores the machine code routines for execution by processor 72, such as the algorithm for decoding encoded data 54.

Illuminator 59 comprises a bank of light-emitting diodes (LEDs) mounted in close proximity to each other so as to cast a uniform illumination on encoded data 54. Under the control of processor 72, illuminator 59 is activated while image sensor 58 scans an image of encoded data 54 through scanning window 52. Processor 72 turns off illuminator 59 when not used to conserve batteries 82. Alternatively, illuminator 59 may be any other light emitting devices capable of illuminating encoded data 54. Image sensor 58 comprises a solid-state sensor and a predetermined lens to attain focus and a substantially full-image view of encoded data 54 along optical paths 60, 61. Preferably, the solid-state sensor is the OV7110 sensor manufactured by Omni Vision Technologies, Inc. of Sunnyvale Calif. The OV7110 is a low-cost monochrome single-chip CMOS sensor with digital output lines that allow direct external access to video data and has a resolution of 644 by 484 pixels. The scanned image of encoded data 54 from image sensor 58 is stored in random access memory 76 while processor 72 decodes encoded data 54.

A digital signal processor (DSP) 80 comprises a codec (coder/decoder) to compress and decompress audio and an analog-to-digital/digital-to-analog (A/D-D/A) converter. Preferably, the codec is a chip-set solution based on Cybit ASC101A low rate audio coder as implemented in the ASM 100 Vocoder Module manufactured by Cybernetics Info-Tech, Inc. of Rockville, Md. Cybit ASC101A features high-compression scalable audio data rates from 0.9 Kbits per second to 2.8 Kbits per second. These are very low audio bit rates by industry standards. For example, telephone quality codec typically operates at 8,000 samples per second at 8-bit resolution which is equivalent to audio bit rate of 64 Kbits per second. As the reader will appreciate, the lower audio bit rate means lower audio quality. Nevertheless, at 2.0 Kbits per second, the ASC101A still achieves a high communication quality with Mean Opinion Score (MOS)=3.2. Mean Opinion Score was developed in the communications industry to determine the general acceptability or quality of voice communication systems or products. Evaluators rate the overall quality of speech/audio samples in a five-category rating scale with points assigned for each level as follows: 5—Excellent, 4—Good, 3—Fair, 2—Poor, and 1 —Bad.

The A/D-D/A converter is conventionally known and preferably is a Texas Instrument TLC320AD50 chip or equivalent. Decompressed audio data is converted into an analog signal representative of the original audio by the D/A converter. This analog signal then goes to an audio amplifier 78 for amplification and then onto loudspeaker 38 for sound reproduction, both of these devices are conventionally known. It should be apparent from these descriptions that other devices capable of decompressing audio data can also be used; for example, other integrated circuit (IC) chips such as the family of TMS320C54X digital signal processors manufactured by Texas Instruments are also considered useful in addition to other numerous multi-IC component design alternatives which are conventionally known. It should also be understood that the functions of several of these chip sets may also be integrated into a single chip in the form of custom large scale integration (LSI). Alternatively, the compression/decompression of audio may also be implemented entirely in a software algorithm to be executed by processor 72.

Having described the main features of print holder 21 and controller 23, the factors affecting the audio data capacity will now be described, namely the resolution of image sensor 58, encodement format overhead and the audio data rate of digital signal processor 80.

Using the preferred image sensor 58 referenced above which has a resolution of 644 by 484 pixels, the theoretical maximum capacity of data decodable from image sensor 58 is 311,696 bits, or 38,962 bytes, provided that each and every data feature of encoded data 54 is mapped exactly and precisely to a corresponding pixel in image sensor 58 and each data feature has a binary value. In practice, this idealized capacity would not be attainable as every form of encodement must accommodate many real-world conditions and also carry overhead information necessary for its own identification and decoding. Using the preferred PaperDisk™ encodement format referenced earlier, some factors that reduce the theoretical maximum capacity are: (a) distortions and inaccuracies introduced by the optics of the described system and by image sensor 58; (b) misalignment between encoded data 54 and the field of view of image sensor 58; (c) quantization errors resulting from mapping data features to image sensor pixels especially where there is skew; (d) overhead of built-in error correction codes (ECC) to allow for data recovery in case of physical damage to encoded data 54; (e) overhead of identification markers in the encodement format to facilitate decoding, and the like. In practice, the net combined effect of these factors reduces the theoretical capacity by a factor of about 10. Hence the theoretical maximum capacity of 38,962 bytes equates to a practical maximum capacity of approximately 3,896 bytes. This capacity represents the practical amount of audio data one can encode on the back of an image print using the aforementioned image sensor 58 and the PaperDisk™ encodement format. Based on the data capacity of 3,896 bytes, TABLE 1 shows the relationship between the audio data rate and audio recording time using the preferred digital signal processor 80 referenced earlier.

TABLE 1

| Audio data rate | Audio recording time |
|---|---|
| 0.9 Kbits/sec | 34 seconds |
| 1.0 Kbits/sec | 31 seconds |
| 1.4 Kbits/sec | 22 seconds |
| 1.8 Kbits/sec | 17 seconds |
| 2.0 Kbits/sec | 15 seconds |
| 2.4 Kbits/sec | 13 seconds |
| 2.8 Kbits/sec | 11 seconds |

As noted in TABLE 1, if desired, there can be a trade off between audio quality and recording time. Preferably this optimization will be done automatically by the encoding software described in further detail below, whereby the highest audio rate will be automatically selected which meets the desired recording time. Preferably, an audio data rate of 2.0 Kbits/sec (with communication quality Mean Opinion Score of 3.2) or higher will be used, resulting in an audio message length of at least fifteen seconds per image print.

Even longer audio recording times can be attained through means (not shown) such as: (a) optimizing the optical components to increase accuracy and reduce distortion; (b) using image sensors with higher pixel resolution, for example, using an image sensor of 1024 by 768 pixels would represent an increase of two and half times the audio capacity over preferred image sensor 58 described above; (c) using each data feature to represent more than a binary value by using different levels of gray or by using different colors with a color image sensor; (d) using both visible and invisible ink or dye to imprint encoded data 54 to essentially multiply the data capacity; (e) using multiple encodings at multiple distinct wavelengths to essentially multiply the encoded data capacity, for example, putting one encoded data in red and another encoded data in green, and using an appropriate filter to read each of the encoded data; (f) using other encodement format offering higher density and capacity; (g) using other codec with higher compression at a higher MOS, and the like.

Operation of First Preferred Embodiment—FIGS. 1 to 6.

The operation of print holder 21 will be described first by reference to FIGS. 1 to 3. Print holder 21 is first prepared for use by loading a vertically arranged stack of image prints 36 into sliding drawer 24 which are supported therein by front wall 30, side walls 28, floor 32 and separator bar 41. Assume for the present description that back surface 46 of each image print is imprinted with encoded data 54 representing human speech. Sliding drawer 24, loaded with image prints 36 is then pushed into frame housing 20 through slot 34 as per arrow 50. Print holder 21 is now ready to successively display, one at a time, the stack of image prints 36 within sliding drawer 24 at viewing aperture 26 as follows:

When sliding drawer 24 is disengaged or pulled away from frame housing 20 until stopped by the stop members (not shown) described earlier, the bottom-most image print 48 of stack 36 is separated by separator bar 41 from the remainder of stack 36. The separated image print is retained within frame housing 20 and guided toward viewing aperture 26 where it is centered for display while the remainder of stack 36 remains intact within the sliding drawer 24 against the separator bar 41. Engaging or pushing sliding drawer 24 back into frame housing 20, as per arrow 50, now causes the displayed print to be repositioned to the top of stack 36, while it is still centered against viewing aperture 26. To summarize, during each complete cycle of disengagement and engagement of sliding drawer 24 within frame housing 20, that is, pulling sliding drawer 24 out fully away from frame housing 20 and sliding it back fully into frame housing 20 again, one image print is removed from the bottom end of stack 36 and returned to the top end of stack 36. For simplicity, henceforward, the pulling of sliding drawer 24 away from frame housing 20 until stopped by the stop members shall be referred to as full "pull-out", the pushing of sliding drawer 24 into frame housing 20 until fully engaged shall be referred to as a full "push-in", and the combination of the two actions in sequence shall be referred to as a full "pull-out/push-in". Additional details relating to the structure of the described device and particularly the print advancement features including the separating and retaining means, are described in greater detail in the previously referenced U.S. Pat. No. 4,939,860, issued to P. Ackeret on Jul. 10, 1990 and assigned to Licinvist, A G.

Print holder 21 described above and in greater detail in the cross referenced patent provides a convenient means for retaining a stack of image prints and for sequentially advancing each print in the stack for viewing. It will be appreciated from the discussion that follows, however, that other devices capable of retaining and advancing prints ire also useful for the present invention herein described and can be substituted for the particularly described structure.

The operation of display apparatus 18 in its totality can now be described by referring to FIGS. 1 to 6, and in particular the logic flow diagram of FIG. 6. All memory areas referenced in FIG. 6 reside in nonvolatile memory 74 so a power-down does not cause loss of data.

Controller 23 is normally in the power-down mode to conserve batteries 82. Upon a user opening sliding drawer 24, drawer switch 42 is activated and starts up processor 72. Processor 72 waits for sliding drawer 24 to be closed again deactivating drawer switch 42. The duration of time that drawer switch 42 is activated is measured by processor 72 and is related to two operational modes of display apparatus 18: first, playing back the audio data associated with image print 49 shown at viewing aperture 26 without causing an advancement of image prints 36, and second, advancing image prints 36 and then playing back the audio data of the newly shown image print 49 under viewing aperture 26.

To play back the audio data associated with image print 49 shown at viewing aperture 26, the user pulls out sliding drawer 24 only partially, just sufficiently to activate drawer switch 42 followed by an immediate pushing in of sliding drawer 24. Due to the inherent design of print holder 21, this partial opening and closing of sliding drawer 24 activates drawer switch 42 only momentarily, preferably less than one second, and does not cause an advancement of an image print.

To advance the image print and play back the audio data of the newly shown image print 49 under viewing aperture 26, the user performs a full pull-out/push-in of sliding drawer 24. The full pull-out/push-in action required to advance an image print inherently takes longer than the above-described partial in/out movement of sliding drawer 24, preferably longer than one second.

First, in the partial in/out movement of sliding drawer 24, when drawer switch 42 is activated for less than one second, processor 72 checks Area T in nonvolatile memory 74 for audio data corresponding top-most image print 49 under viewing aperture 26. If found, processor 72 sends this audio data to digital signal processor 80 for audio playback. If no data is found, no task is executed. In either case, once complete, processor 72 goes into a power-down mode.

Second, when drawer switch 42 is activated for one second or more during a full pull-out/push-in of sliding drawer 24, and bottom-most image print 48 of stack 36 is moved to become top-most image 49 of stack 36 under the viewing aperture 26, processor 72 moves any audio data found at Area B to Area T in order to maintain the correct correspondence between top-most image print 49 under the viewing aperture 26 and its associated audio data. Since image sensor 58 always scans encoded data 54 from bottom-most image print 48 while the top-most image print 49 is what is shown under the viewing aperture 26, processor 72 must move audio data from Area B to Area T to maintain synchronization whenever an image print is advanced. Processor 72 then turns on illuminator 59 and image sensor 58 performs an image scan of encoded data 54 seen through scanning window 52. The scanned image is decoded by processor 72 and the resultant audio data is stored in Area B; this audio data is not to be played back immediately because it belongs to bottom-most image print 48 of stack 36. Processor 72 then checks Area T for audio data belonging to top-most image print 49 that is currently under viewing aperture 26. If audio data is found at Area T, processor 72 sends it to digital signal processor 80 for audio playback. If not, no task is executed. In either case, once complete, processor 72 goes into power-down mode.

In the above description, the mode of operation was determined from the duration of drawer switch 42 activation. Alternatively, a second switch (not shown) located at the stop member (referenced under FIG. 1 but not shown) can be used. This second switch is activated only when sliding drawer 24 is fully disengaged from frame housing 20. Activation of both the second switch and drawer switch 42 would indicate that the user has advanced to the next image print. Still other methods of sensing the mode of operation are possible, including but not limited to optical, magnetic, voice recognition and the like.

Figure 6:
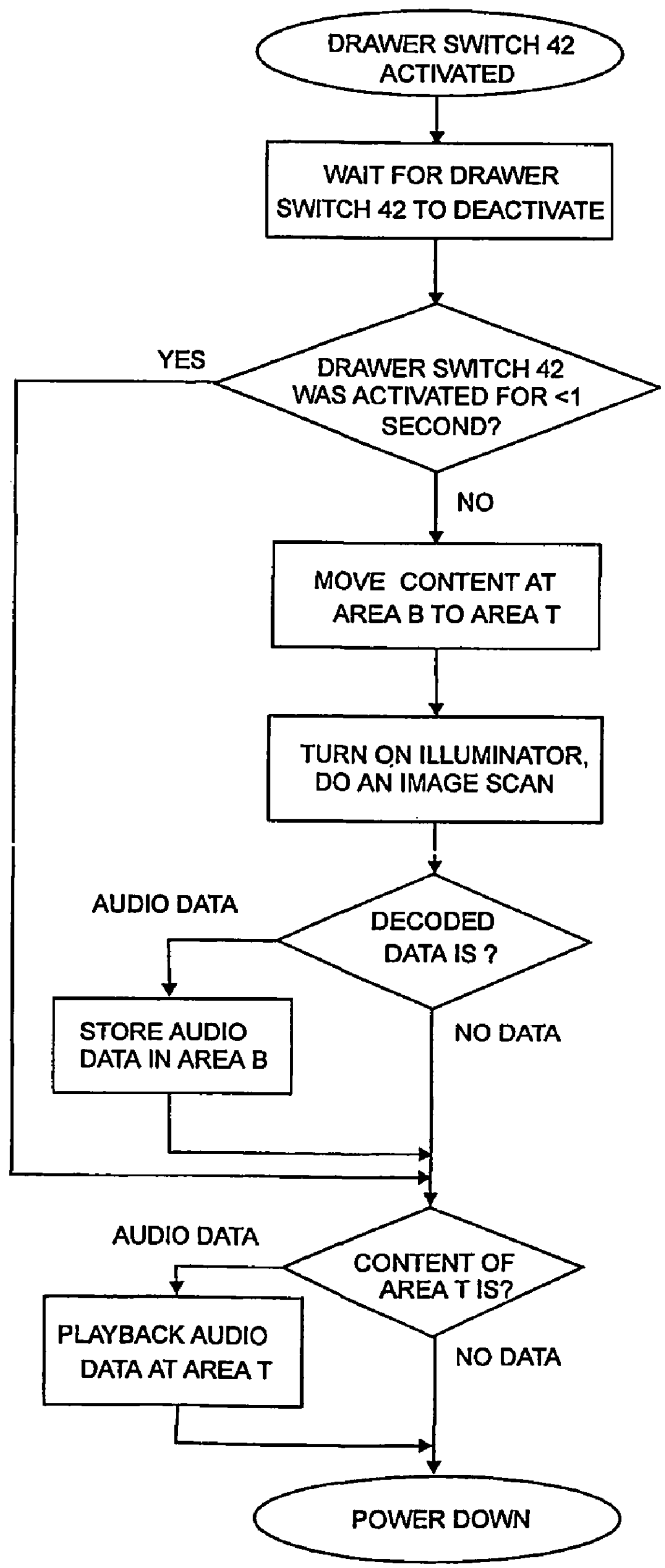
FIG. 6 is a logic flow diagram showing the operation of the display apparatus shown in FIG. 1.

FIG. 6 describes the process of playing back of audio data which are already encoded on back surface 46 of the image prints. Next the steps for audio recording and imprinting encoded data 54 on the image prints will be described. Additional equipment and software required for the following steps are described but not shown in figures.

For audio recording, a microphone-equipped computer, a printer and a predetermined audio recording and encoding software will be required. Audio recording software is preferably based on the audio compression algorithm from Cybernetics InfoTech, Inc. of Rockville, Md. referenced earlier. Cybernetics supplies such algorithms in ANSI C code, 16-bit fixed-point C code or Windows 95/NT DLL (dynamic link libraries). Preferably, the audio recording software automatically selects the highest audio data rate that will accommodate the duration of the particular audio recording, hence optimizing the audio quality. Encoding the audio data is preferably based on the PaperDisk™ software from Cobblestone Software, Inc., of Lexington, Mass. referenced earlier. The PaperDisk™ software is for PC compatible, 386 or above, and Windows 3.1 or Windows 95.

As described earlier with respect to FIG. 4, the imprinting process may be accomplished by the user with a computer, a printer and a predetermined software, or by the photo finishing laboratory as a step in the photo finishing process. If the imprinting is done by the user, briefly the steps are as follow for each image print using the predetermined software described above: (a) enter into the computer any textual information desired on the image print, (b) record through the computer microphone an audio message desired for the image print, (c) place the corresponding image print into the printer and activate the printing for imprinting encoded data 54 on its back surface. FIG. 4 shows an example of a typical output. Imprinting directly on back surface 46 of an image print is preferably done using a resin ink thermal transfer printer technology such as Alps Micro-Dry™ MD-2010 printer manufactured by Alps Electric (USA), Inc. of San Jose, Calif. As an alternative to imprinting directly, encoded data 54 may be imprinted first on an adhesive label using a laser printer or inkjet printer. The label can then be affixed to back surface 46 of an image print.

If the imprinting is to be done as a step in the photo finishing process of the photographic print by the photo finishing laboratory, the photo finishing laboratory will require the user to send in data that is representative of the human readable information and the audio data together with the picture image data. Briefly the steps are as follow: (a) enter into the computer any textual information desired on the image print, (b) record into the computer through the microphone an audio message desired for the image print, (c) send the text data, audio data and image data specific to each image print to the photo finishing laboratory. These data may be transported either physically through the use of traditional storage media such as magnetic media, optical media, solid-state memory device and the like, or electronically through use of email, FTP or Internet and the like. This approach to imprinting encoded data 54 is particularly applicable when a digital camera is used for taking the original picture. There is also little equipment or software required by the photo finishing laboratory to provide such imprinting service to customers.

Description of a Further Preferred Embodiment—FIGS. 7 to 10

A further preferred embodiment of the present invention will now be described in detail. This further preferred embodiment incorporates all of the features of the first preferred embodiment plus additional features that permit audio recording with display apparatus 18, features for associating audio recording to the image print, and features for transferring audio data to an external device for imprinting of encoded data 54.

Figure 7:
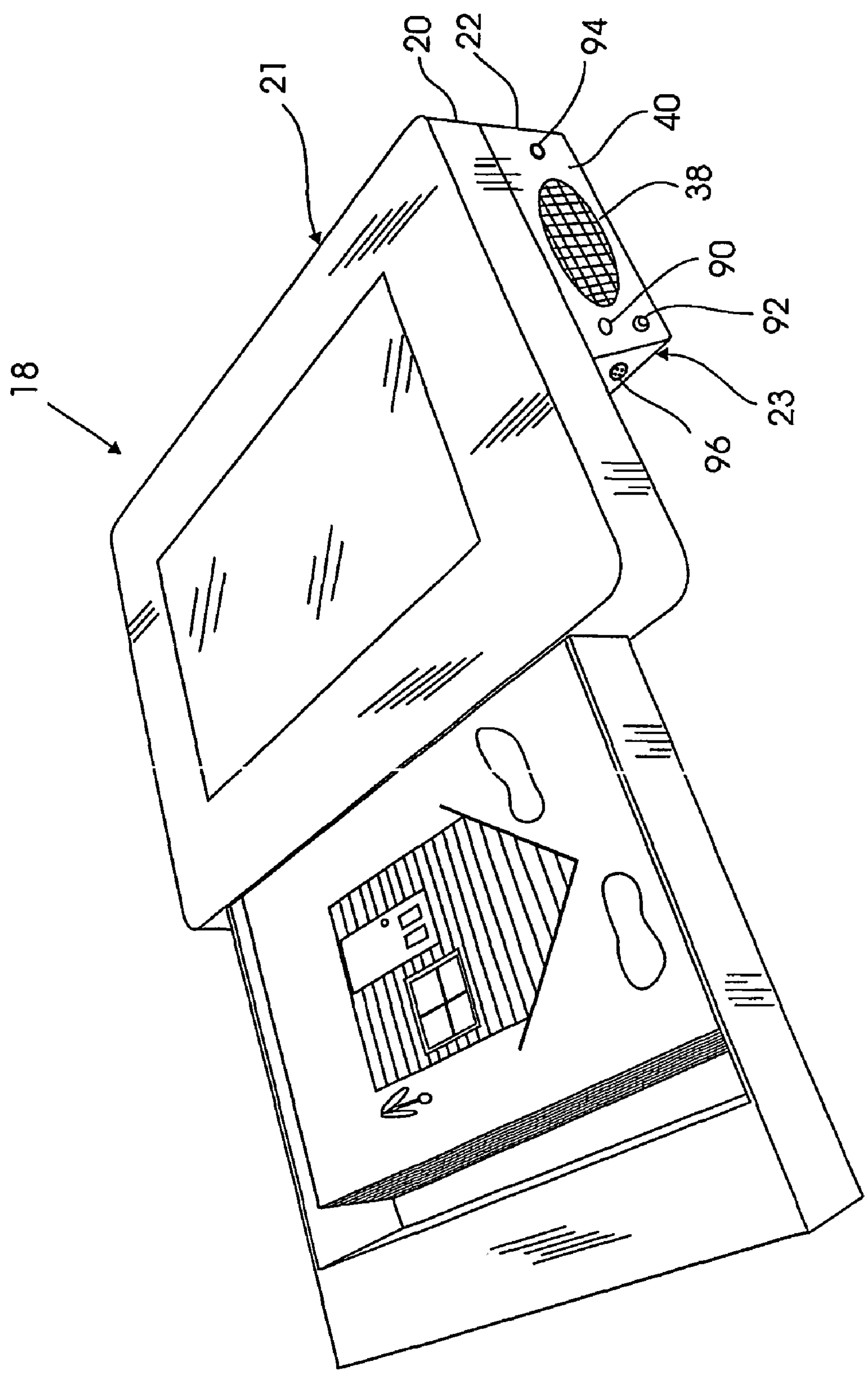
FIG. 7 is a perspective view of a further preferred embodiment of the display apparatus of the present invention, facing up.

FIG. 7 shows the above-described additional components attached to exterior supporting surface 40 of controller housing 22, namely a microphone 90, a record switch 92 for activating audio recording, a transceiver 94 for wireless communication with external devices (not shown), and a data connector 96 for wired communication with external devices (not shown). Transceiver 94 preferably utilizes the industry standard IrDA (infrared data association) serial protocol technology. Data connector 96 provides for a wired connection to external devices, preferably via a serial interface.

Figure 8:
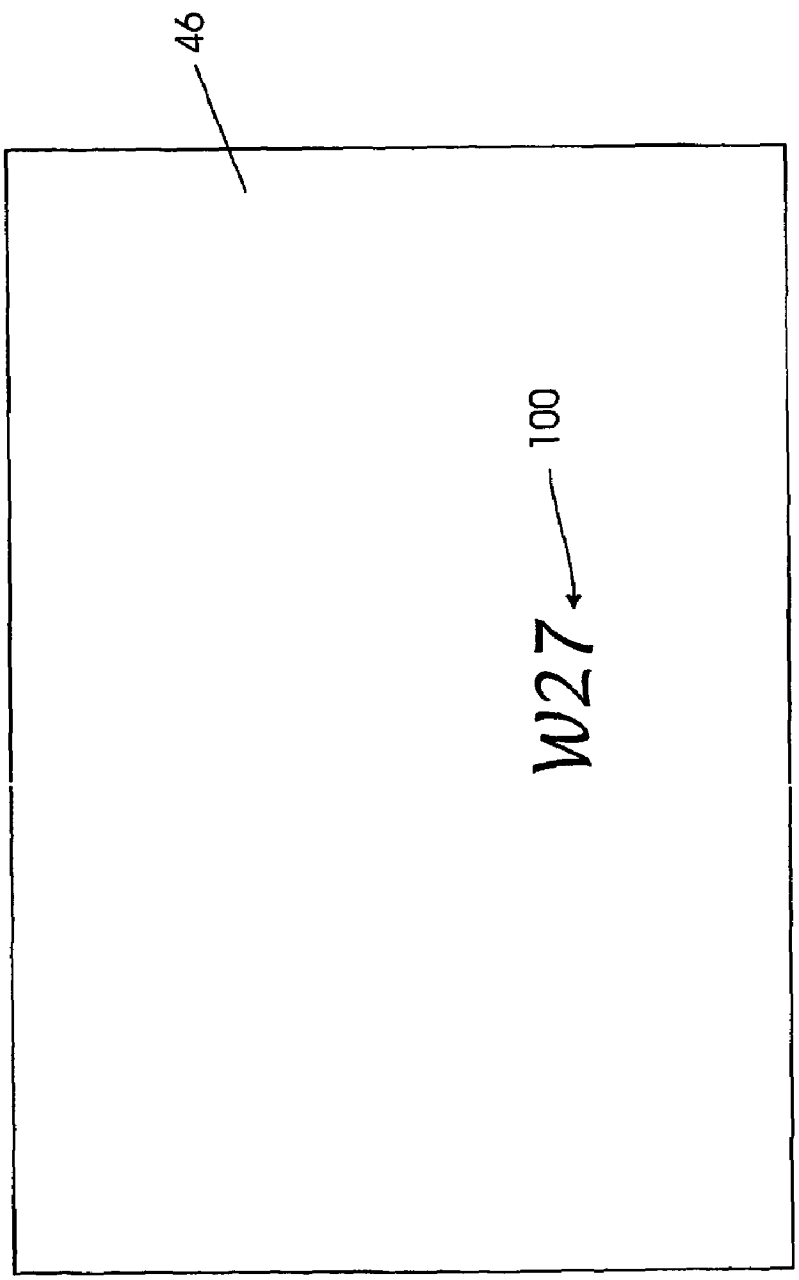
FIG. 8 is an exemplary representation of the back surface of an image print used in the preferred embodiment of the present invention shown in FIG. 7.

FIG. 8 shows an exemplary layout of back surface 46 of an image print representing the first step in the annotation process of this further preferred embodiment. A unique picture identification marking ("PID") 100 designated by the user is handwritten on back surface 46 of an image print. Preferably, PID 100 is limited to a three-character alphanumeric writing for ease of decoding by processor 72. PID 100 is placed on back surface 46 of an image print in a location where it will be substantially centered within scanning window 52 when the image print is the bottom-most image print 48 at the bottom of sliding drawer 24, and sliding drawer 24 is fully engaged within frame housing 20. Preferably PID 100 is easily removable as it serves only to temporarily associate an image print to its corresponding audio data during the annotation process and will not be required after the imprinting of encoded data 54. A number of marking apparatuses exist on the market which can be easily erased. One example is the Erasemate™ Pen manufactured by PaperMate™ in which the ink from the pen can be erased as easily as pencil marks. Alternatively, PID 100 may be handwritten on a removable adhesive label and affixed to back surface 46 of an image print. The label could then be removed prior to imprinting of encoded data 54.

Figure 9:
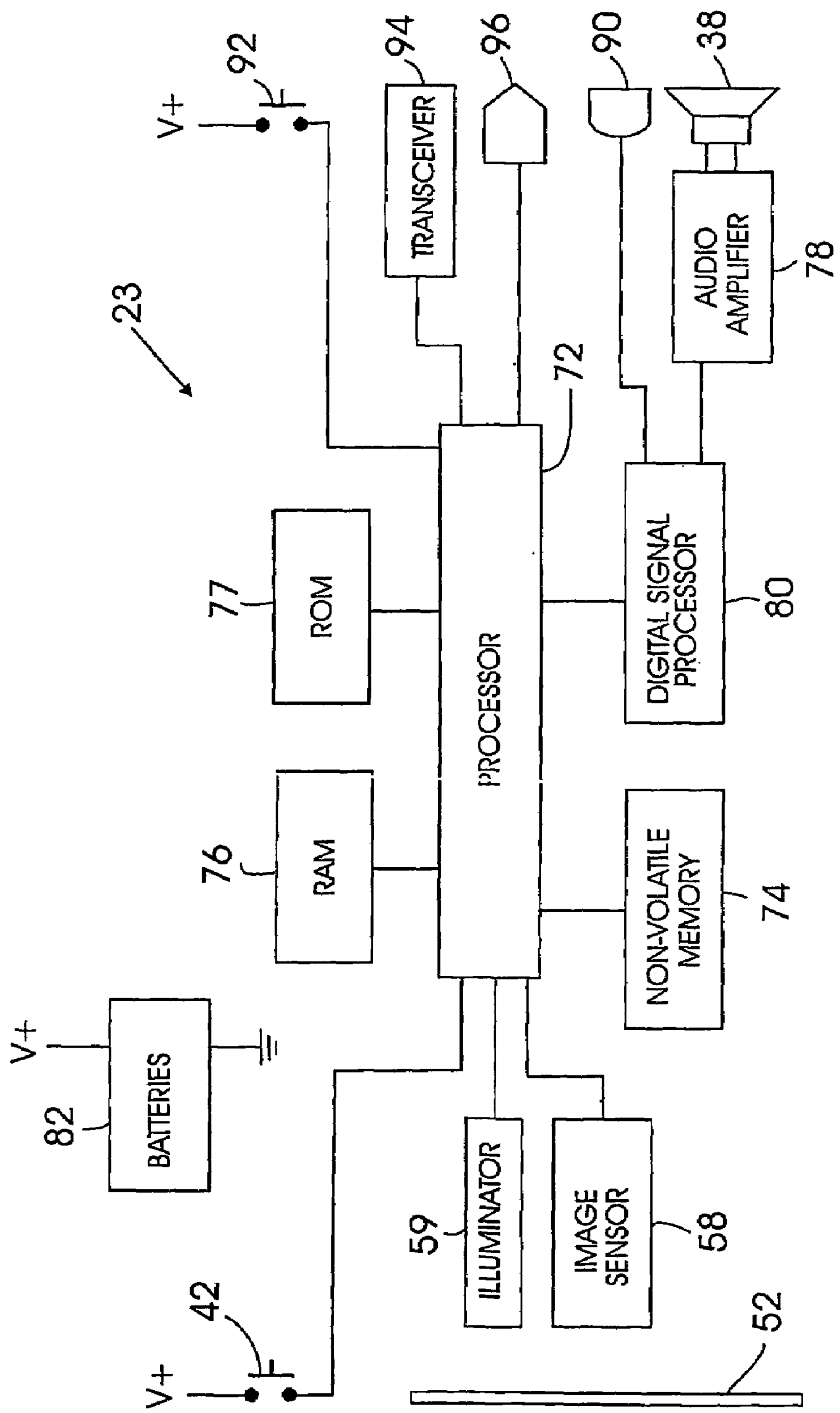
FIG. 9 is a block schematic diagram of the electrical subsystem of the preferred embodiment of the display apparatus of the present invention shown in FIG. 7.

FIG. 9 shows the additional electrical components of controller 23 in the further preferred embodiment of the present invention, namely microphone 90, which is preferably a subminiature type which is conventionally known, record switch 92 for activating audio recording, transceiver 94 for wireless communication with external devices (not shown), and data connector 96 for wired communication with external devices (not shown). Analog signals from microphone 90 are first converted into digital format by the A/D function of digital signal processor 80 and then compressed into audio data by the codec function of digital signal processor 80. Transceiver 94 preferably utilizes the industry standard IrDA (infrared data association) serial protocol technology, or alternatively may comprise a RF transmitter and receiver pair, or other well known wireless communication devices and protocols. Data connector 96 provides for a wired connection to external devices, preferably via a serial interface, but may also be parallel or any other suitable input-output interface to effect digital data transfer.

Nonvolatile memory 74 has additional memory allocation beyond that described in the first preferred embodiment above. A discrete storage area is logically allocated within nonvolatile memory 74 to hold catalog (not shown) information. The catalog is a list of entries consisting of two fields: the PID 100 and a PID address (not shown). The PID address points to an area in nonvolatile memory 74 for storing audio data corresponding to PID 100. The catalog can be implemented on a perpetual first-in first-out (FIFO) basis by keeping a predetermined number of the most current PID 100 entries.

Processor 72 has additional functions of decoding handwriting and synthesizing speech. The function of decoding handwriting is performed through a process commonly known as Optical Character Recognition (OCR), and more specifically, handwriting recognition (HWR). Algorithms for handwriting recognition are available from a number of commercial sources. The applicant has found the Allegro handwriting recognition system from Fonix Corporation of Salt Lake City, Utah to be particularly useful. Such an algorithm is incorporated into read-only memory 77. Preferably PID 100 is limited to a three-character alphanumeric writing for ease of decoding. Alternatively, PID 100 may contain a variable length of alphanumeric characters for increased versatility. The function of synthesizing speech is performed through an algorithm called text-to-speech whereby input in the form of text data is synthesized into human recognizable speech. There are many commercially available text-to-speech algorithms on the market and are conventionally known to those skilled in the art. Such an algorithm is also incorporated into read-only memory 77.

Figure 10A:
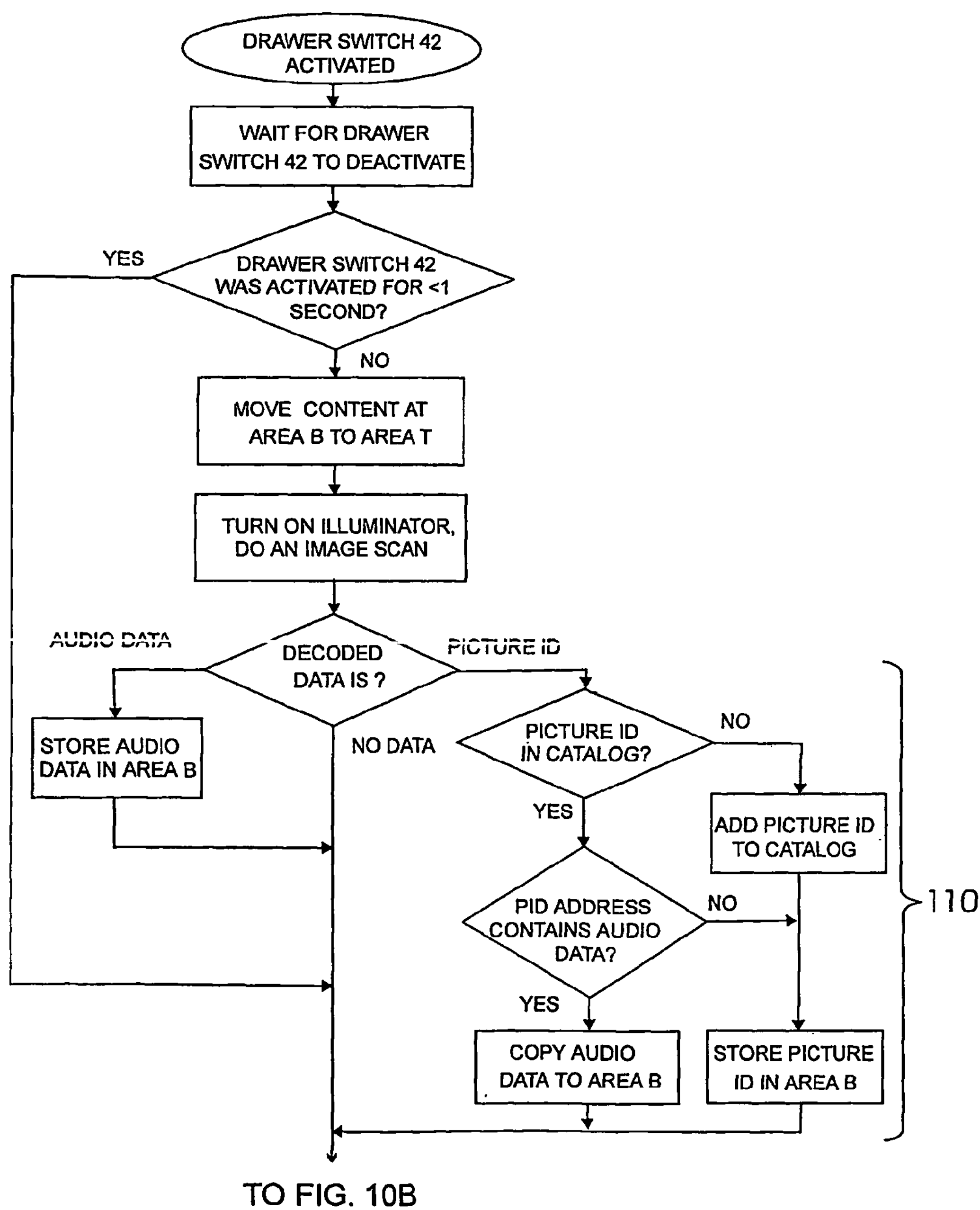
FIGS. 10A and 10B are logic flow diagrams showing the operation of the preferred embodiment of the display apparatus of the present invention shown in FIG. 7.
Figure 10B:
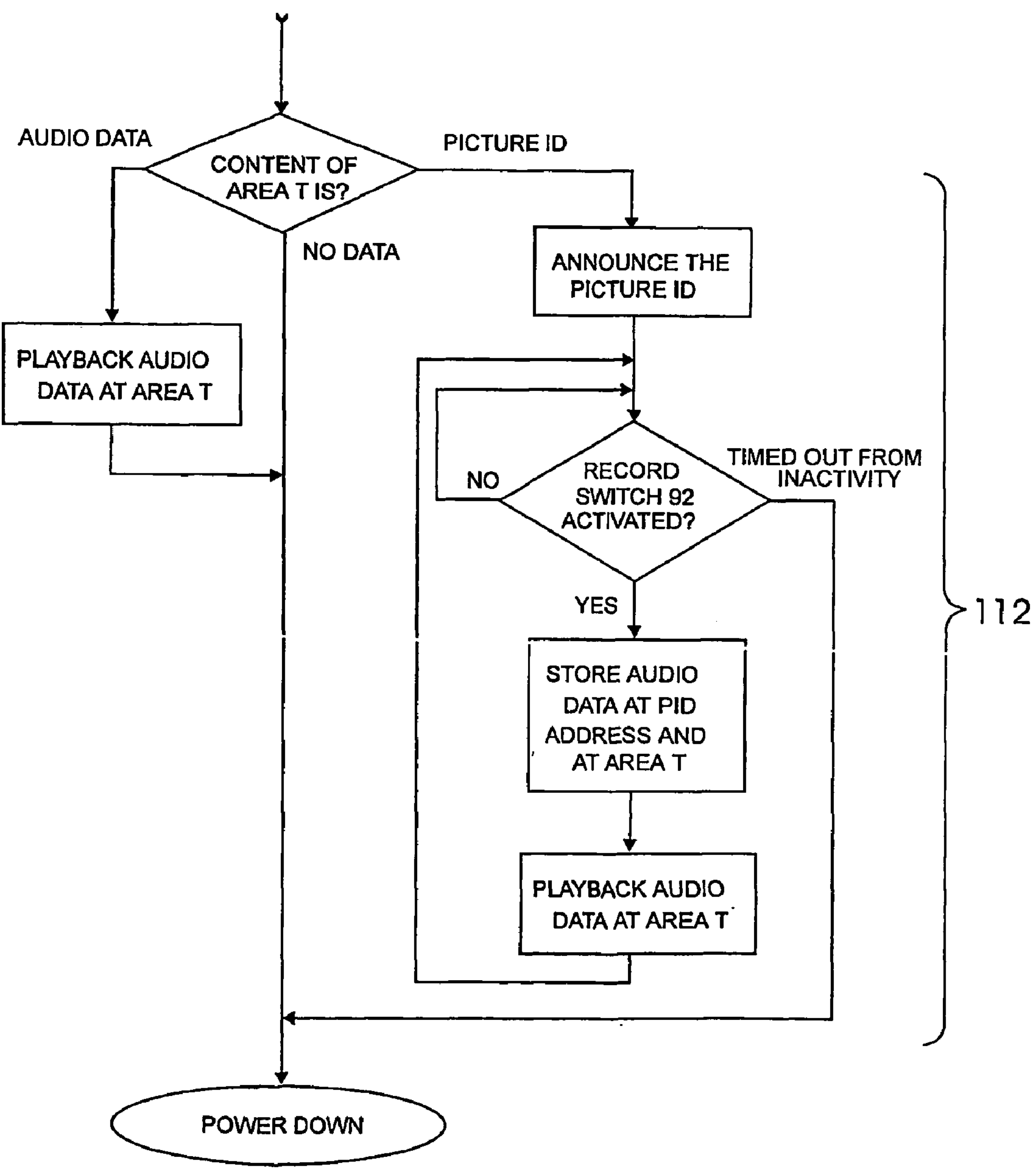

Operation of a Further Preferred Embodiment—FIGS. 10A to 10B

The further preferred embodiment of the present invention incorporates all of the functions of the first preferred embodiment plus additional functions of audio recording, associating audio recording to the image print, and transferring audio data to external devices for imprinting of encoded data 54. In this further preferred embodiment, audio recording can be done directly using display apparatus 18, whereas in the first preferred embodiment, the annotation procedure required the use of a separate computer to conduct the audio recording. Hence, this further preferred embodiment has the advantage that audio recording can be done anywhere. A computer and a printer are needed only at the time of imprinting encoded data 54 on the image prints.

Audio recording using display apparatus 18 will be described first followed by the imprinting of encoded data 54 on the image prints.

FIGS. 10A and 10B are the logical flow diagrams of this further preferred embodiment. A comparison will show that the logic flow for this further preferred embodiment is an extension of the first preferred embodiment logic flow with the addition of two routines: a routine 110 to process PID 100 information and a routine 112 to perform audio recording. Other processes are the same as in the first preferred embodiment. The two additional routines 110 and 112 will now be described. All memory areas referenced in FIG. 10 reside in nonvolatile memory 74 so a power-down does not cause loss of data.

Prior to loading the stack of image prints 36 into display apparatus 18, the user places a unique handwritten PID 100 on back surface 46 of each image print. These unique PID 100 are used by the present invention to associate audio recording with each image print. PID 100 is written on the image print in a location where it will be substantially centered within scanning window 52 when the image print is the bottom-most image print 48 in sliding drawer 24, and sliding drawer 24 is fully engaged within frame housing 20. Preferably PID 100 is limited to a three-character alphanumeric writing, and is easily removable after use.

Assume now that the stack of image prints 36 described above have been loaded into sliding drawer 24. Referring to FIG. 10A, the entry point to routine 110 starts when the decoded data is found to contain PID 100. PID 100 of the bottom-most image print 48 will not be found in the Catalog since this was the start of the new stack of image prints 36. Therefore, an entry will be added to the catalog containing this PID 100 and its corresponding PID address. The PID 100 itself is also stored in Area B of nonvolatile memory 74. To understand and follow what happens next, consider that the bottom-most image print 48 is now advanced to become the top-most image print 49. As this occurs, the content of Area B is moved to Area T. Referring now to FIG. 10B, the entry point to routine 112 starts when the content of Area T is found to contain PID 100. PID 100 from Area T is announced through loudspeaker 38 so the user has an audio confirmation of the identity of top-most image print 49 currently shown under viewing aperture 26. The announcement is in the form of synthesized speech generated by the text-to-speech algorithm and the digital signal processor 80. Each alphanumeric character is announced one at a time such as "double-u . . . two . . . seven" using the example of PID 100 shown in FIG. 8. Processor 72 waits for the user to activate record switch 92 to do an audio recording for top-most image print 49. For the duration that record switch 92 is activated, processor 72 stores audio data at the PID address corresponding to PID 100, and also into Area T. Upon deactivation of record switch 92, processor 72 plays back the stored audio data from Area T through loudspeaker 38 for user verification. If, after the audio replay, the user is dissatisfied, a new recording can be made by depressing record switch 92 again and repeating the process. There is a time-out feature whereby if record switch 92 remains idle or not activated for a predetermined time, preferably after thirty seconds, it will be assumed that the user does not want to make or further modify a recording, then processor 72 goes into power-down mode. As can be observed from routine 112, once record switch 92 has timed out, there is no provision to modify an existing audio recording. Such a provision has been omitted from the flow diagrams for simplicity. Other alternative modes of starting and stopping recording are also possible. For example, activating record switch 92 may give the user a fixed time duration in which to make an audio recording, or audio recording may be started by activating record switch 92 once, and stopped by activating record switch 92 once again.

The above description refers to the situation where PID 100 did not initially exist in the catalog. When PID 100 already exists in the catalog (referring back to FIG. 10A routine 110), processor 72 checks to see if the corresponding PID address for PID 100 contains audio data. If audio data is found, it means the user had previously made an audio recording for this image print, so processor 72 copies this audio data to Area B. The remaining steps in the logic flow diagram show the play back of this audio data when this image print is advanced to the top-most image print 49 of the stack 36. If no audio data is found, it means the user has not yet made an audio recording for this image print, so processor 72 stores PID 100 in the Area B, and the user will be given an opportunity to make an audio recording for this image print in the same manner as described before.

After completing the above-described process for each image print in stack 36, each image print will have an associated audio recording stored in nonvolatile memory 74 of display apparatus 18. The next step of imprinting encoded data 54 on back surface 46 of the image prints will now be described.

Preferably, transceiver 94 communicates through wireless means to transfer PIDs 100 and their associated audio data from nonvolatile memory 74 of display apparatus 18 to a computer, eliminating the need for a physical link. Where a wireless link is not available, data connector 96 is used to transfer the data by wired means. Data transfer is initiated by activating predetermined software on the computer. Once PIDs 100 and their associated audio data have been transferred to the computer, the remaining imprinting process is the same as that described above with respect to the first preferred embodiment. The only exception is that just prior to putting the image print into the printer for imprinting encoded data 54, PID 100 is removed as it is no longer needed once the associated audio data is encoded on back surface 46 of the image print.

In routine 112 of FIG. 10B, digital signal processor 80 preferably uses the highest audio data rate for audio recording. Then, prior to the imprinting of encoded data 54 on the back surface 46 of the image print, the software on the computer selects the highest audio data rate that will accommodate the duration of the associated audio recording so as to maximize the audio quality of encoded data 54.

While PID 100 is a temporary marking to serve the end purpose of imprinting encoded data 54 on the correct corresponding image print, a user may choose to operate display apparatus 18 using PID 100 indefinitely without ever imprinting encoded data 54 on the image prints. Such usage is limited only by the amount of audio recording storage capacity of nonvolatile memory 74.

Additional Preferred Embodiments

Additional preferred embodiments are described below but are not shown in the accompanying figures.

In another preferred embodiment, controller housing 22 with controller 23 parts housed therein is detachably mounted to frame housing 20. When controller housing 22 is separated from frame housing 20, this self-contained controller 23 can scan and playback encoded data 54 from photographic prints even if the prints are stored inside photo albums, provided that back surface 46 of the photographic prints are visibly accessible to the optical components of controller 23. In this embodiment, controller 23 is held against back surface 46 of a photographic print, a playback switch (not shown) is activated causing controller 23 to scan an image, decode encoded data 54, and then play back the decoded audio data. This embodiment of the present invention has broad application beyond image prints and associated audio recording, such as transferring non-audio data from printed sheets to an electronic hand-held device.

In still another preferred embodiment, nonvolatile memory 74 is detachably mounted to controller 23 so that it may then be physically removed from controller housing 22 and inserted into a computer or other imprinting device to effect the transfer of data to the computer. This also has the advantage of allowing a large number of annotations to be completed at one time by simply detaching nonvolatile memory element 74 whenever it becomes "full" and replacing it with another nonvolatile memory element 74 to continue the annotation with other image prints.

In yet another embodiment, encoded data 54 may contain text data instead of audio data, whereby such text data is played back as synthesized speech through text-to-speech conversion. This arrangement has the advantage of allowing a longer audio playback than is possible through the digitization of human speech. This embodiment has many broad applications, such as for example in children's story books whereby a long narrative story may accompany each picture card, or it may act as a reading device for the visually impaired.

In another embodiment, the function of the computer and printer is replaced by a self-contained standalone device capable of: (a) audio recording or receiving digital audio data from display apparatus 18, (b) digitizing and compressing the recorded audio into audio data, (c) taking in an image print from an input tray, imprinting encoded data 54 onto back surface 46 of the image print and transporting it to an output tray. Such a self-contained device has the advantage of compactness.

Still other preferred embodiments are described below which use different materials for the viewing aperture. New materials are described below but are not shown in the figures.

In one further preferred embodiment, the viewing aperture 26 is made of a clear or transparent touch sensitive screen material (not shown). Preferably the touch screen is based on the analog resistive type technology allowing finger, gloved hand or stylus activation. Touch screen technology is conventionally known to those skilled in the art. The electrical output of the touch screen is connected to processor 72 and processed as user input information. In this arrangement, encoded data 54 on each image print conveniently comprises machine instruction, text data and the like, relevant to the respective image print. Thus, when an image print is advanced to viewing aperture 26, the machine instruction contained within encoded data 54 is executed in conjunction with user input from the touch screen. In operation, therefore, a user can interact with display apparatus 18 by means of activating specific areas of the touch screen corresponding to the information visible through viewing aperture 26. For example, when used as a child's learning aid, an image print may contain pictures of several different animals. Encoded data 54 for that image print will contain pertinent information relating to the location of each animal on the image print. When a user presses the area of the touch screen corresponding to a particular animal as indicated by encoded data 54, display apparatus 18 plays back the name of the animal through speech synthesis such as: "This is a tiger." When the user advances to the next image print, different animals are shown and encoded data 54 corresponding to the new image print is read and stored. Hence different messages are played back when different areas on the touch screen are activated. Alternatively, the display apparatus may ask the user: "Where is the tiger?", to which the user is expected to touch that area of the touch screen where the tiger is seen. In another example of a use of the present invention as a child's learning aid, each image print may contain letters of the alphabet. The user is instructed to hand trace the letter shown using a stylus on the touch screen. The hand tracing is then analyzed by processor 72 by means of handwriting recognition or simple pattern matching algorithms. A congratulatory message is played back to the user if the tracing was done correctly.

In another preferred embodiment, viewing aperture 26 is made of liquid crystal display (LCD) material (not shown). Preferably the LCD is a transmissive type allowing light to pass through the LCD, hence images on the LCD appear as an overlay to the image print visible under viewing aperture 26. For increased visibility, a light source (not shown) may be located directly beneath viewing aperture 26 to provide illumination to the front surface of the image print. Transmissive LCD technology is conventionally known to those skilled in the art. The LCD is electrically connected to processor 72 and serves to provide dynamically changeable visual information to the user. Encoded data 54 on each image print comprises machine instruction, text data and the like, relevant to the respective image print. Thus, when an image print is advanced to viewing aperture 26, the machine instruction contained therein is executed and information is displayed on the LCD accordingly. In operation, when a user advances an image print to viewing aperture 26, processor 72 plays back audio information through loudspeaker 38 and visual information through the LCD display. The visual information on the LCD may also create an animation effect by means of activating successive areas of the LCD screen against the static background picture of the image print. For example, when used as a child's story book, a boy may be represented by a simple stick-figure displayed on the LCD against the background picture of buildings. Processor 72 plays back the story lines through speech synthesis such as: "See Johnny leave his house. See Johnny walk by grandma's house. See Johnny go to the school."; while successively activating the areas of the LCD corresponding to where Johnny is according to the narration, hence creating an animation effect of Johnny walking from his home to his school. When the user advances to the next image print, different picture and story lines are read from encoded data 54 and then played back as described above.

In yet another preferred embodiment, the features of the touch screen and the LCD described above are simultaneously incorporated into display apparatus 18. The result is an interactive display apparatus that can both accept user input information and output information to the user. For example, when used as a child's question and answer response tool, the user may be asked to select all the objects shown on an image print that belong in the kitchen, such as pots and pans. As the user selects each correct object through the touch screen, a check mark appears on the LCD corresponding to where the object is located on the image. When all the objects have been selected correctly, a congratulatory message is played back to the user. Furthermore, the user responses may be stored in nonvolatile memory 74 and output to an external device such as a computer for record keeping of the correct responses. This data may be transferred either through the use of data connector 96 or transceiver 94.

Description of a Second Further Preferred Embodiment—FIGS. 11A to 11D and 12.

In this preferred embodiment, the function of imprinting the machine-readable data on the back surface of the image print is incorporated within display apparatus 18, thus eliminating the need for a separate computer and printer as in previous embodiments. This second further preferred embodiment is thus capable of: (a) recording audio, (b) converting the recorded audio into machine-readable data, and (c) imprinting the machine-readable data onto the back surface of the image print in the form of encoded data 54, using an imprinter disposed within display apparatus 18. Also, whereas previously the process of recording audio and the process of imprinting were batched, in this preferred embodiment, these steps are performed sequentially, with each audio recording followed immediately by imprinting the corresponding image print. Hence the previously required process of first handwriting PIDs 100 on the back surface 46 of each image print is no longer necessary.

Referring to FIGS. 11A to 11D, four different configurations of this preferred embodiment are shown. This preferred embodiment incorporates all of the parts and functions from the FURTHER PREFERRED EMBODIMENT described above and shown in FIGS. 7 to 10, with the further addition of a micro printer 115 (see for example, FIG. 11D) for printing encoded data 54. For each of the four configurations, micro printer 115 is disposed in a different location within display apparatus 18. Micro printer 115 is characterized by ultra compactness, lightweight and low power consumption, well suited for portable battery-operated usage. Examples of such micro printers can be found from manufacturers such as Alps Electric Co., Ltd., Seiko Instruments Inc., Epson America, Inc., and Fujicopian Co., Ltd. Referring to FIG. 12, micro printer 115 is connected to processor 72 to receive machine-readable data for imprinting. ROM 77 includes additional software routines to convert audio data into machine-readable data and then send this machine-readable data to micro printer 115 for imprinting as encoded data 54.

Figure 11A:
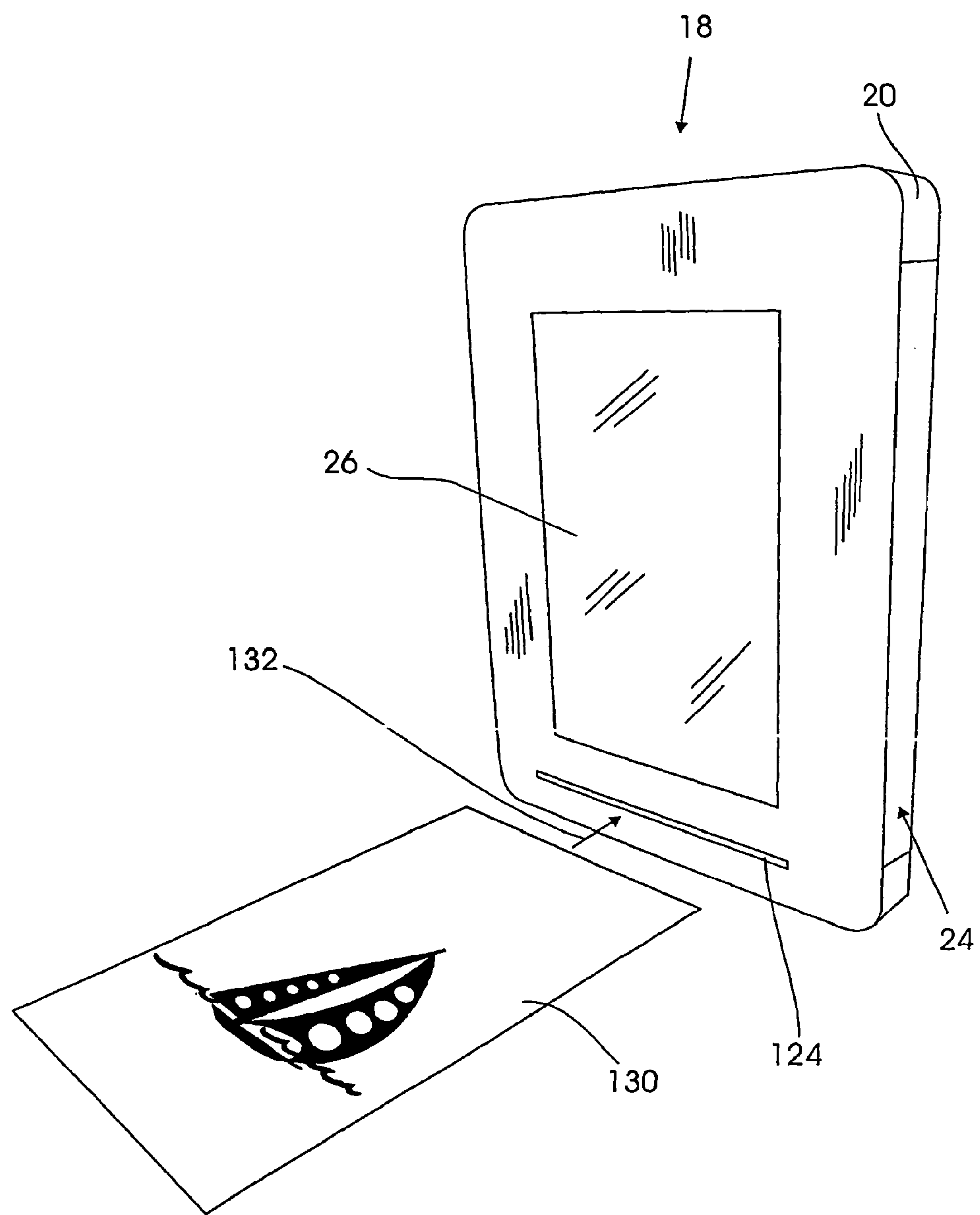
FIGS. 11A to 11D are perspective views of four configurations of a second further preferred embodiment of the invention, showing means for imprinting image prints.
Figure 12:
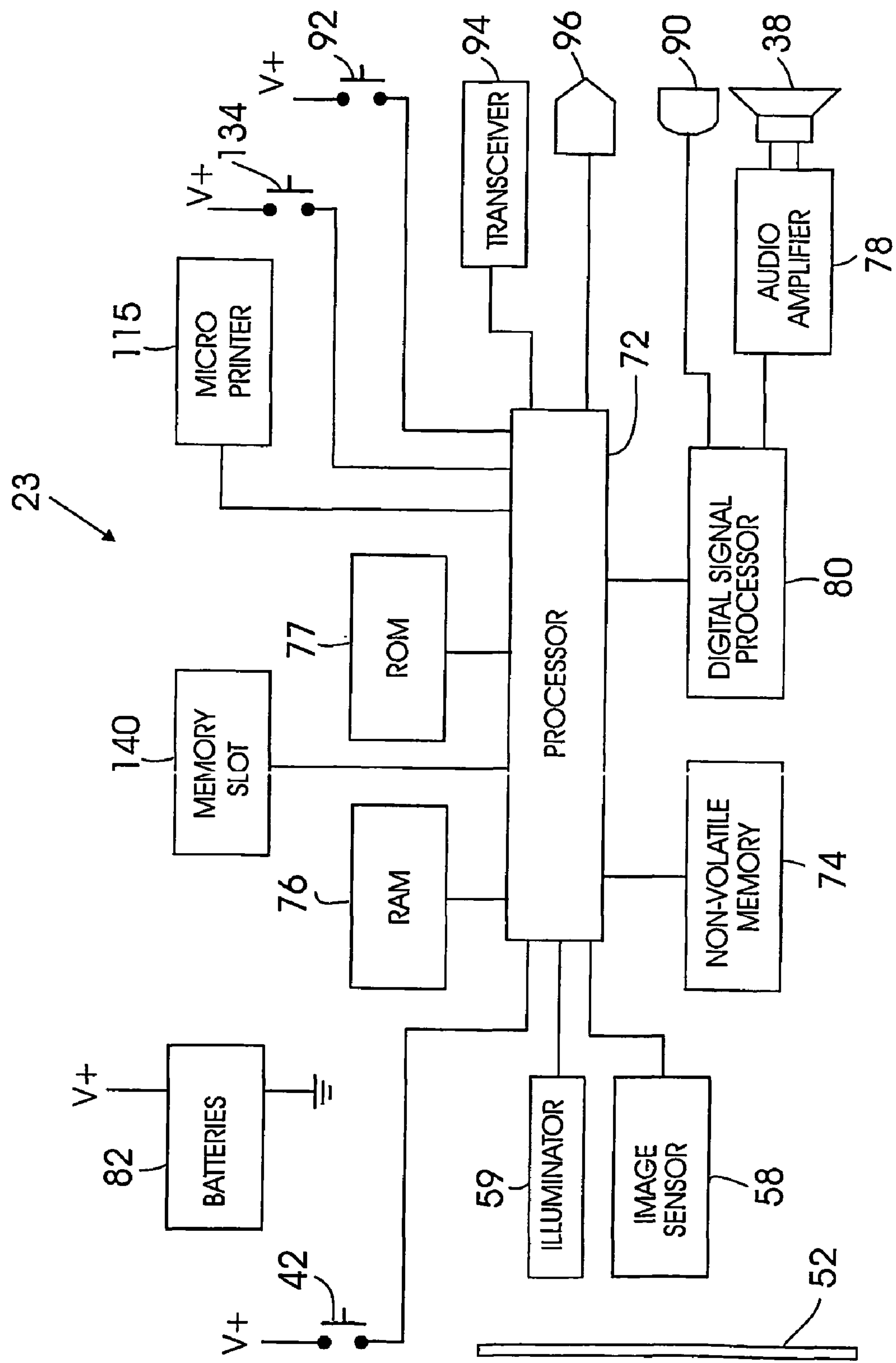
FIG. 12 is a block schematic diagram of the electrical subsystem of the display apparatus shown in FIGS. 11A to 11D and FIG. 13.

In FIG. 11A, micro printer 115 (not shown in FIG. 11A) is located within frame housing 20 of display apparatus 18. An input slot 124 is located on the front surface of frame housing 20 and an output slot (not shown) is located opposite input slot 124 on the back surface of frame housing 20.

Figure 11B:
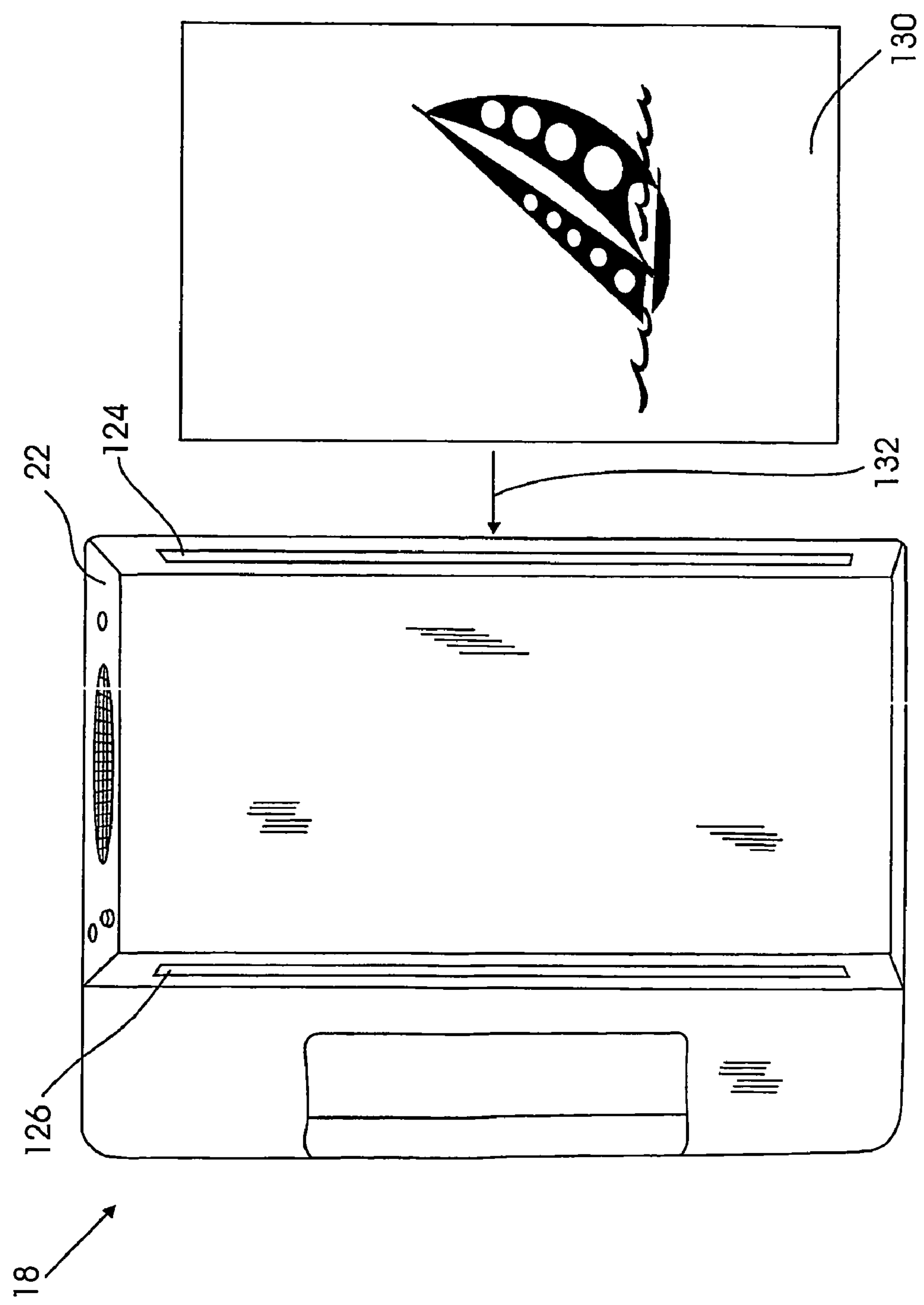

In FIG. 11B, the back side of display apparatus 18 is shown. Micro printer 115 (not shown in FIG. 11B) is located within controller housing 22. In this configuration, input slot 124 is located on the right side of controller housing 22, while an output slot 126 is located on the left side when viewed facing the back of display apparatus 18 as shown in FIG. 11B.

Figure 11C:
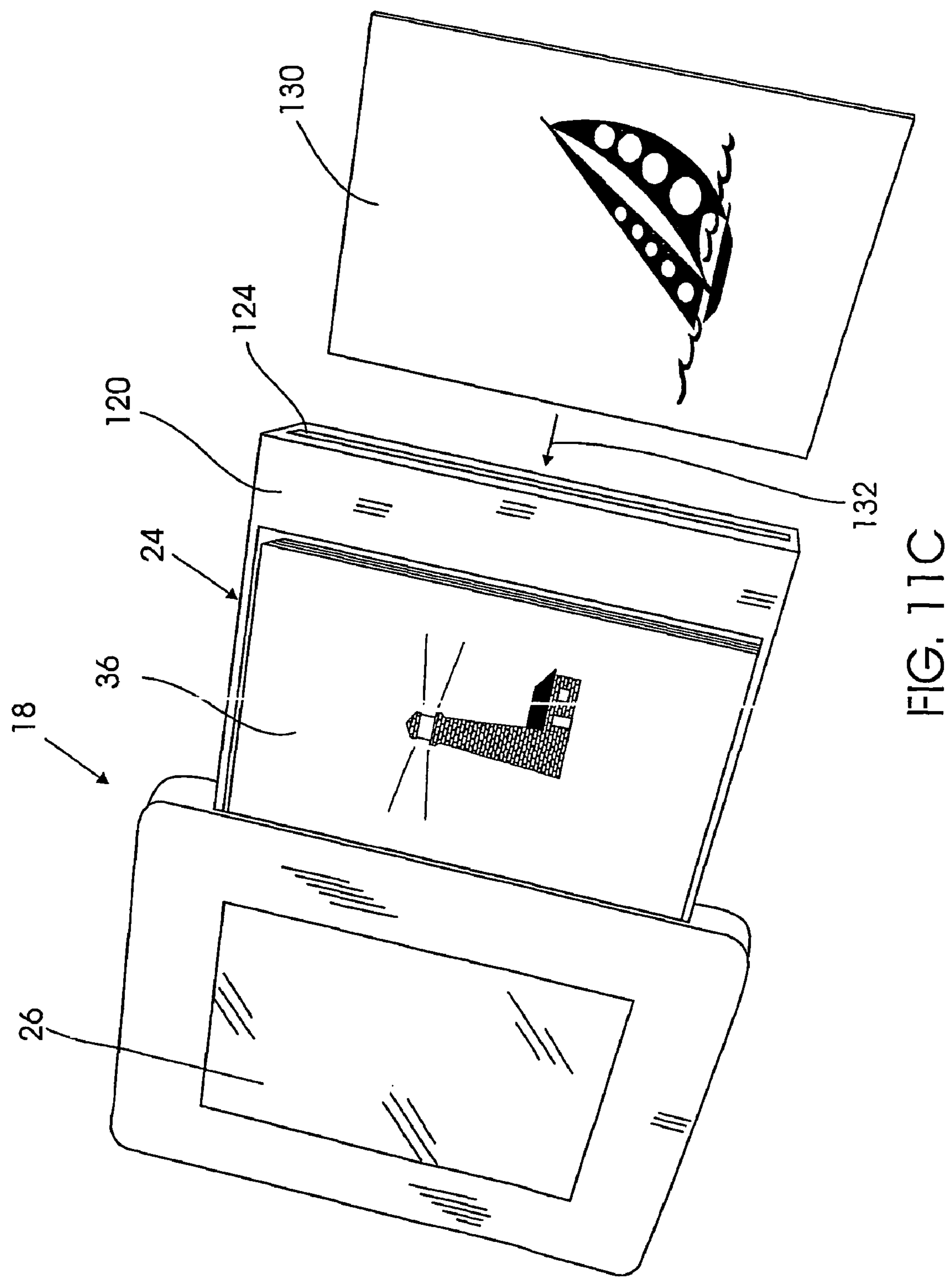

In FIG. 11C, micro printer 115 (not shown in FIG. 11C) is located in a sliding drawer handle portion 120 of sliding drawer 24. On the outward facing side of sliding drawer handle 120, there is an input slot 124, while an output slot (not shown) is located on the inward facing side of sliding drawer handle 120, directly opposite input slot 124.

Figure 11D:
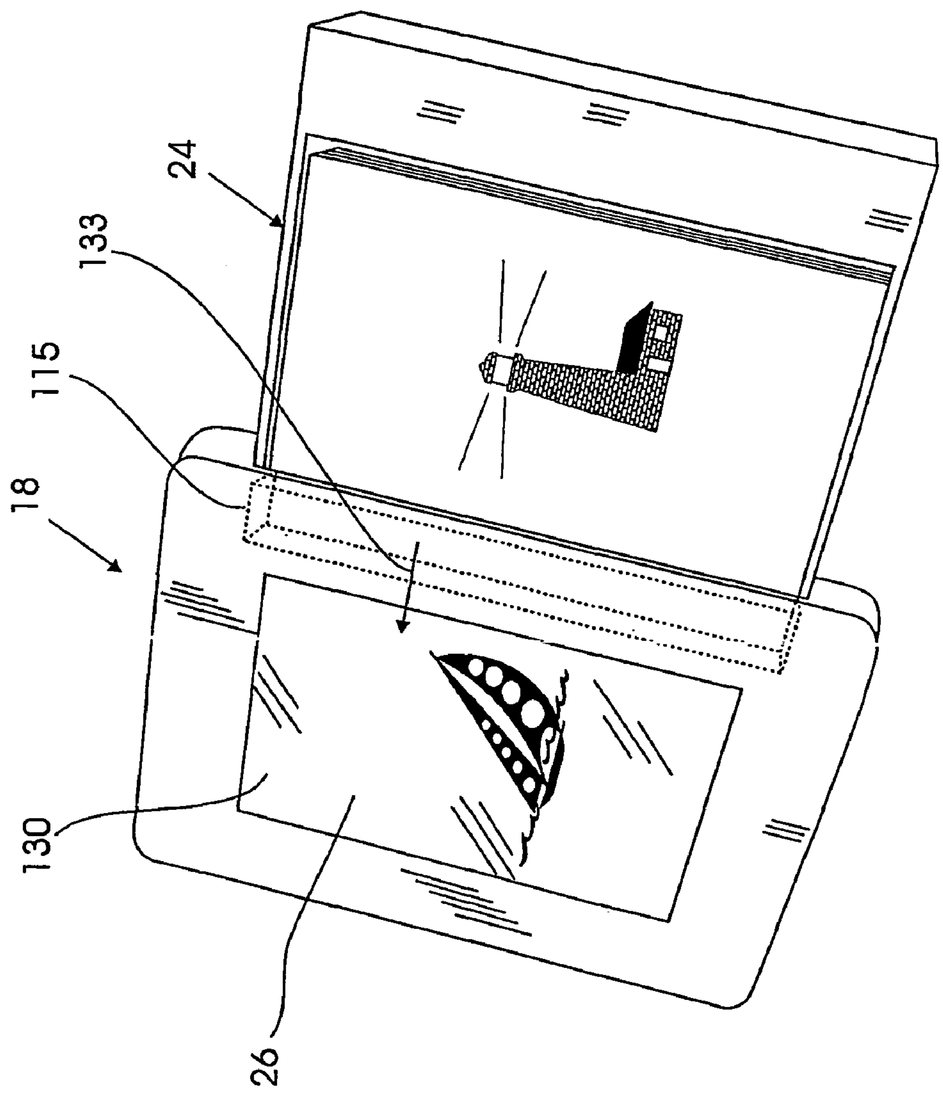

In FIG. 11D, micro printer 115 is shown to be located on the separator bar (not shown in FIG. 11D) of sliding drawer 24. In this configuration, during the closing of sliding drawer 24, the print head (not shown) of micro printer 115 passes directly over the back surface 46 of image print 130 that is shown through viewing aperture 26. Imprinting of encoded data 54 can be accomplished directly onto back surface 46 of image print 130 by micro printer 115 during the closing of sliding drawer 24. Alternatively, instead of imprinting directly on back surface 46, it is also possible to first imprint a label with encoded data 54, and during the closing of sliding drawer 24, micro printer 115 applies the label to back surface 46 of image print 130.

Operation of Second Further Preferred Embodiment—FIGS. 11A to 11D and 12

The operation of the four configurations of the second further preferred embodiment of the invention will now be described referring to FIGS. 11A-11D. In all configurations, the user starts by making an audio recording corresponding to the image print shown through viewing aperture 26 using the recording functions of display apparatus 18. The audio recording procedure is similar to the operation previously described in OPERATION OF A FURTHER PREFERRED EMBODIMENT— FIGS. 10A to 10B. In this case, however, it is not necessary to first handwrite PIDs 100 on the back of each image print since imprinting of the machine-readable data on the image prints takes place immediately following the making of each audio recording.

For the configuration shown in FIG. 11A, the user starts by making an audio recording for the image print 130, which is shown in viewing aperture 26. Once the recording has been made, the user fully opens sliding drawer 24 and removes image print 130 from the stack of image prints 36 in sliding drawer 24. The user then fully closes sliding drawer 24 and inserts image print 130 into input slot 124 with the image side facing up. Image print 130 is drawn in through input slot 124 by the paper feeding mechanism (not shown) of micro printer 115 in the direction shown by arrow 132, while the machine-readable data, in the form of encoded data 54, is imprinted on the back surface 46 of image print 130 by micro printer 115. The imprinted image print 130 is then retrieved from the output slot located on the back of display apparatus 18. Image print 130 now has machine-readable data encoded on its back surface 46 in the form of encoded data 54, and may be placed back into sliding drawer 24 immediately or later. This process is repeated for each of the image prints to be annotated and imprinted with machine-readable data. In an alternative mode of operation, the user first fully opens sliding drawer 24, removes the entire stack of image prints 36, and then fully closes sliding drawer 24. The user then selects one of the image prints 130 and uses display apparatus 18 to make an audio recording associated with this image print. When satisfied with the recording, the user inserts image print 130 into input slot 124 and retrieves the imprinted image print from the output slot. The user then repeats this process for each of the image prints to be annotated and imprinted with encoded data 54. When all of the image prints have been annotated and imprinted, the user opens sliding drawer 24, returns the stack of image prints 36, and fully closes sliding drawer 24.

For configuration shown in FIG. 11B, the operation is identical to the operation of the configuration described above and shown in FIG. 11A. Image print 130 is inserted into input slot 124 with the image side facing up. Image print 130 is drawn in through input slot 124 by the paper feeding mechanism (not shown) of micro printer 115 in the direction shown by arrow 132, while the machine-readable data, in the form of encoded data 54, is imprinted on the back surface 46 of image print 130 by micro printer 115. The imprinted image print 130 is then retrieved from output slot 126.

For the configuration shown in FIG. 11C, the user starts by making an audio recording for image print 130, which is shown in the viewing aperture 26. Once the recording has been made, the user fully opens sliding drawer 24 and removes image print 130 from the stack of image prints 36. The user inserts image print 130 with image side facing up into input slot 124 located on the outside surface of sliding drawer handle 120. Image print 130 is drawn in by the paper feeding mechanism (not shown) of micro printer 115 in the direction shown by arrow 132, while the machine-readable data, in the form of encoded data 54, is imprinted on the back surface 46 of image print 130 by micro printer 115. Image print 130 is then fed through the output slot (not shown), whereby the imprinted image print 130 is deposited to the top of the stack of image prints 36 in sliding drawer 24. Image print 130 now has machine-readable data imprinted on its back surface 46 in the form of encoded data 54. The sliding drawer may now be closed and this process can be repeated. In an alternative mode of operation, the user first fully opens sliding drawer 24, removes the entire stack 36 of image prints and leaves sliding drawer 24 fully open. The user then selects one of the image prints 130 and uses display apparatus 18 to make an audio recording associated with this image print. When satisfied with the recording, the user inserts image print 130 into input slot 124 for imprinting. Following imprinting, image print 130 is output through the output slot and deposited within sliding drawer 24. The user repeats this process for each image print, all the while keeping sliding drawer 24 fully open. When all of the image prints have been annotated and imprinted, the stack of image prints 36 will be conveniently located back within sliding drawer 24. The user may then close sliding drawer 24.

For the configuration shown in FIG. 11D, the user starts by first fully opening sliding drawer 24. While sliding drawer 24 is fully open, the user makes an audio recording for image print 130 shown in viewing aperture 26. Once the recording is made, the user closes sliding drawer 24. During the closing of sliding drawer 24, the print head of micro printer 115, which is located on the separator bar (not shown in FIG. 11D), passes directly over the back surface 46 of image print 130 shown in the viewing aperture 26 in the direction shown by arrow 133 and imprints the machine-readable data onto the back surface 46 of image print 130, in the form of encoded data 54. Hence, unlike previous configurations described, in this configuration, the encoded data 54 is imprinted on the back surface 46 of image print 130 without first requiring the removal of image print 130 from display apparatus 18 for feeding into micro printer 115. Alternatively, instead of imprinting directly on back surface 46, it is also possible to first imprint a label with the machine-readable data, and during the closing of sliding drawer 24, micro printer 115 applies the label to back surface 46 of image print 130.

Likewise for the other configurations discussed, while direct printing is desirable for imprinting the machine-readable data, it is also possible to first print on a label and then have the printer mechanism apply the label to the back surface of the image print or in the alternative, one may apply the label manually. Also, the micro printer may be designed to be installed as an optional add-on to the display apparatus to be conveniently purchased by customers at a later time. Moreover, while four configurations and possible locations for micro printer 115 have been shown and discussed, those skilled in the art will readily appreciate that other configurations are possible, which configurations are all intended to fall within the scope of the invention as set out in the appended claims.

In summary, the ability of the present invention to imprint machine-readable data, in the form of encoded data 54, without requiring a separate computer and printer is both convenient and time saving. This additional function, in combination with the display and storage functions of display apparatus 18, results in a self-contained annotation and display apparatus that is also portable and battery-operated.

Description of a Third Further Preferred Embodiment

In this preferred embodiment, a method for capturing audio corresponding to an image at the time of capturing the image and for later playback is described. The method includes using a camera capable of making an audio recording, converting the audio recoding into machine-readable data, imprinting the machine-readable data onto the corresponding developed image print, and then playing back the imprinted image print in the display apparatus. For this method, the display apparatus of the FIRST PREFERRED EMBODIMENT or the FURTHER PREFERRED EMBODIMENT may be used.

A camera having audio recording capability is conventionally known, be it a single-use film camera, a conventional film camera, an instant film camera or a digital camera. In a typical camera capable of making an audio recording corresponding to a photographic exposure, an audio recording can be made before, during or after making the exposure. Audio recording is typically initiated by the user by means of activating an audio recording switch on the camera. Audio recordings made by these cameras can be stored in a variety of mediums such as optically, for example, on the film negative itself, magnetically, for example, on the magnetically coated film negative, or in a solid-state medium. It is also known in the prior art to affix solid-state audio storage medium onto the film cartridge or film canister itself for increased capacity and to avoid loss or separation between the images and the audio recordings. Each of these elements are conventional known, hence details not relating specifically to the understanding of the present invention have been omitted. The method of the present invention will now be described, first in the case of a single-use film camera, then in the case of a conventional film camera, and lastly in the case of a digital camera.

Single-Use Film Camera:

A suitable corresponding audio recording is made as each photographic exposure is taken. Once all the film has been exposed, the entire single-use camera is typically taken to a suitably equipped photo developer for developing and printing. The photo developer retrieves all of the audio recordings and develops the film negatives in a conventional manner, producing a set of image prints. The photo developer then converts the audio recordings into machine-readable data and imprints the data on the back surface of each corresponding image print in the form of encoded data 54. The set of image prints, now bearing the corresponding audio recordings in the form of encoded data 54 printed on their back surfaces, is returned to the customer. The customer places the image prints into display apparatus 18 and is able to listen to the corresponding audio recordings while viewing each image print.

Conventional Film Camera:

A suitable corresponding audio recording is made as each photographic exposure is taken. Once all the film has been exposed, the film cartridge, along with the integrated audio recordings, is returned to a suitably equipped photo developer for developing and printing. The photo developer retrieves all of the audio recordings and develops the film negatives in a conventional manner, producing a set of image prints. The photo developer then converts the audio recordings into machine-readable data and imprints the data on the back surface of each corresponding image print in the form of encoded data 54. The set of image prints, now bearing the corresponding audio recordings in the form of encoded data 54 printed on their back surfaces, is returned to the customer. The customer places the image prints into display apparatus 18 and is able to listen to the corresponding audio recordings while viewing each image print.

Digital Camera:

A suitable corresponding audio recording is made as each image is captured. Once a desired number of images and corresponding audio recordings have been captured, the user takes the image and audio files to a suitably equipped photo developer. In the alternative, the files can be transferred over the Internet to an on-line developer or taken to a retail photographic kiosk equipped to read such files directly from the particular storage medium used. The image and audio files can be stored and transferred individually, for example, as JPEG and WAV files respectively, or each image and its corresponding audio message can be combined into a single audio-image file format such as SoundPix™, developed by SoundPix, Inc. of Incline Village, Nev. The photo developer produces a set of image prints from the image files and converts the audio recordings into machine-readable data. The developer then imprints the machine-readable data on the back surface of each corresponding image print in the form of encoded data 54. The set of image prints, now bearing the corresponding audio recordings in the form of encoded data 54 printed on their back surfaces, is returned to the customer. The customer places the image prints into display apparatus 18 and is able to listen to the corresponding audio recordings while viewing each image print.

In summary, the main advantage of making an audio recording at the same time as the corresponding image is captured is that the pertinent information related to the image is more likely to be recorded than if the audio recording is made some time after the picture is taken, perhaps while viewing the photos a few days or weeks later. This is especially true when one takes an extended trip or goes on vacation. This method provides users with a convenient way of recording an audio recording corresponding to a captured image and receiving back from a developer image prints having machine-readable data corresponding to the audio recording imprinted directly on the image prints for immediate playback and enjoyment using the display apparatus of the present invention. This method is particularly user friendly as the user is not directly involved with the intricacies of imprinting the machine-readable data on the image prints.

Figure 13:
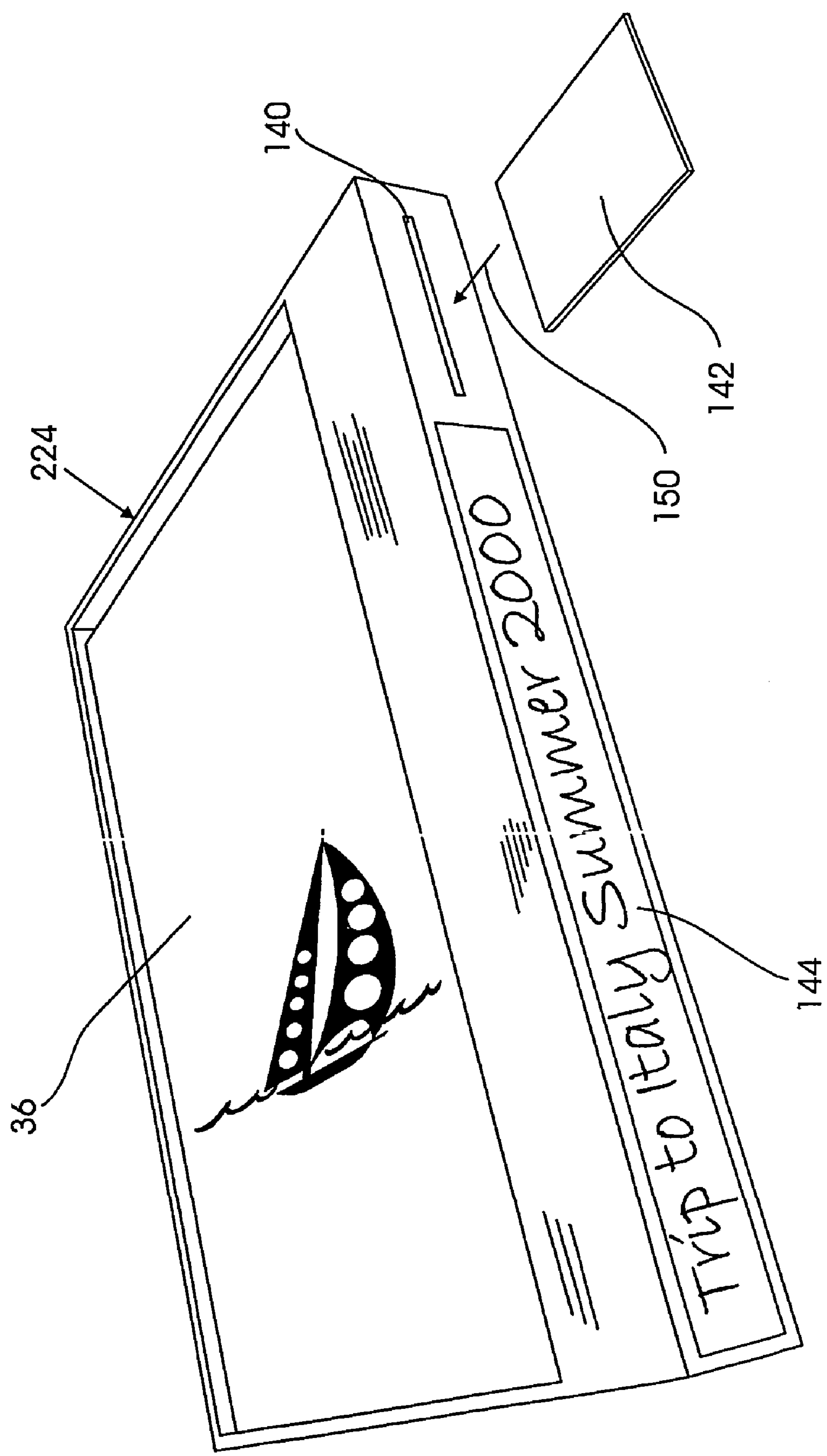
FIG. 13 is a perspective view of a detachable cassette of a fourth further preferred embodiment of the invention.

Description of a Fourth Further Preferred Embodiment—FIGS. 12 to 13.

In this preferred embodiment, as illustrated in FIGS. 12 and 13, sliding drawer 24, as described in the DESCRIPTION OF A FIRST PREFERRED EMBODIMENT—FIGS. 1 to 6, is replaced by a detachable sliding cartridge or cassette 224. Each detachable sliding cassette 224 is capable of holding a stack of image prints 36, which when contained within cassette 224 are together referred to as a "portfolio of annotated image prints," or briefly as a "portfolio". Even though each of the image prints contained in the stack 36 may be annotated by means previously described herein, there has up to now been no provision described for annotating the entire portfolio itself. For example, one may wish to record a voice annotation for the portfolio that provides introductory remarks such as: "This collection of thirty-six vacation photos is taken from our trip to Italy in the summer of 2000". Ideally, this introductory remark is played back each time cassette 224 is newly inserted into display apparatus 18.

The following is a description of a portfolio annotation system that allows the user to create an annotation corresponding to the content of the portfolio.

This preferred embodiment incorporates all of the parts and functions of the DESCRIPTION OF A FURTHER PREFERRED EMBODIMENT—FIGS. 7 to 10, with some additions and modifications as described below. FIG. 13 shows a detachable cassette 224 fully detached from display apparatus 18. Cassette 224 is detachable from frame housing 20 of display apparatus 18 by disengaging the stop members (not shown) that were described in the DESCRIPTION OF A FIRST PREFERRED EMBODIMENT—FIGS. 1 to 6. Cassette 224 includes a memory slot 140 into which a storage element 142 may be inserted in the direction shown by arrow 150. Memory slot 140 has electrical connections to processor 72 through electrical contacts (not shown) in cassette 224 and opposing and complementary electrical contacts (not shown) in frame housing 20. Memory slot 140 can be constructed to hold a variety of storage elements 142, preferably a compact storage element is used, such as the MultiMediaCard marketed by SanDisk Corporation of Sunnyvale, Calif., which is about the size of a postage stamp. Storage element 142 is used to hold user annotation, such as audio data, for the portfolio. Since storage element 142 is removable, elements of varying capacity can be used depending on the length of the annotation desired. In addition, storage element 142 may hold information other than audio information, such as machine data or text data, for use in other electronic equipment or to exchange information with other devices.

On the outer surface of cassette 224, there is a place for putting a label 144 used for marling the title of the particular portfolio.

ROM 77 of controller 23 contains two additional software routines (not shown), one for keeping track of which detachable cassette 224 has being inserted into frame housing 20, and the other for keeping track of which of the image prints in the portfolio is being viewed and played back within each associated cassette 224. To achieve this tracking function, one method is for controller 23 to generate and store checksums for each cassette and image print. A checksum is a computed value which depends on the content of a block of data being examined. Techniques for generating checksum are conventionally known. For example, for each detachable cassette 224, controller 23 generates a cassette checksum from data read from storage element 142. Controller 23 compares the cassette checksum to a cassette checksum previously generated and stored in Non-Volatile Memory 74. If the checksums are different, controller 23 determines that a new cassette 224 has been inserted. The same technique can be used to keep track of which annotated image print is being viewed and played back. Each time audio data is decoded from the machine-readable data on the back surface 46 of an image print, controller 23 uses the machine-readable data to generate an image checksum, which is stored in storage element 142 for later retrieval and comparison. Alternatively, a sensor strategically located within the frame housing 20 may be used to detect only the changing of cassettes 224.

For the purpose of recording an audio message corresponding to the portfolio, display apparatus 18 includes a portfolio recording switch 134, connected to processor 72 (see FIG. 12). Recorded audio data corresponding to the portfolio is stored in storage element 142.

Operation of Fourth Further Preferred Embodiment—FIGS. 12 to 13

Operation of the portfolio annotation system describe above, and the use of tracking information will now be described referring in particular to FIGS. 12 to 13. The portfolio playback process will be described first, assuming that storage element 142 already contains annotation corresponding to the stack of image prints 36 residing in cassette 224 (together referred to as a portfolio). The user inserts cassette 224 into frame housing 20 through slot 34 (see FIG. 1). When cassette 224 is in the fully pushed-in position; storage element 142 makes electrical contact with processor 72 through memory slot 140. Controller 23, upon detecting that storage element 142 has been connected, reads the contents of storage element 142 and generates a cassette checksum. Controller 23 compares this checksum with a previously generated and stored cassette checksum in the Non-Volatile Memory 74. If different, controller 23 determines that a different cassette 224 has been inserted and proceeds to play back the introductory audio information contained within storage element 142, corresponding to the new portfolio. For example, the introductory audio message may be: "This is the collection of our vacation photos from our trip to Italy in the summer of 2000", thus giving the user an overview of the photos about to be viewed. Thereafter, with each pull-out and push-in of cassette 224, the annotated message corresponding to each image print displayed is played back in accordance with previous descriptions. Whenever a different cassette 224 is inserted into frame housing 20, it is detected and the associated introductory message is played back.

The portfolio annotation recording process will now be described. In general, portfolio annotation is the recording of a message characterizing the portfolio, which is the entire stack of image prints 36 contained within detachable cassette 224. For example, the portfolio recording might say: "This is the collection of our vacation photos from our trip to Italy in the summer of 2000", whereas the annotation for an individual image print within the portfolio might say: "Here is our family standing before the Leaning Tower of Pisa.", "Here is a beautiful gondola we saw in Venice." and so on. The portfolio recording can be made whenever cassette 224 is in the fully pushed-in position with storage element 142 installed. The portfolio recording is made by activating portfolio recording switch 134 while speaking into microphone 90. Audio data from the portfolio recording is stored in storage element 142. Included as well are means to erase and re-record the portfolio messages.

Described below are variations of the above recording and playback scenario whereby several different portfolio audio messages are recorded and played back for the same portfolio.

In one such variation, rather than having a user listen to a very long introductory message when cassette 224 is first inserted into frame housing 20, the portfolio message is divided into several shorter messages for playback at various intervals while viewing and listening to image print annotations. For example, the following sequence might be used: portfolio message #1, first photo annotation, second photo annotation, portfolio message #2, third photo annotation, fourth photo annotation, portfolio message #3 etc. One possible method for achieving this playback pattern is as follows: The user first records two very short (less than 1 second each) silent portfolio recordings, followed by a series of different portfolio audio messages, which the user wishes to have played back interleaved between image print annotations. Controller 23, is programmed to interpret the two very short blank recordings to mean that after playback of two photo annotations a portfolio message next in series should be played back. This interleaved playback of portfolio messages and image print messages is then continuously repeated. Those skilled in the art will understand and appreciate that other methods of achieving this same or other playback patterns are possible.

In another such variation, a particular portfolio message is associated with a particular image print being displayed, thus providing additional or supplemental annotation to the annotation of a particular image print. This may be desired because the annotation for the individual image print is not of sufficient length, or new information has become available since the individual image print annotation was made. One possible method for achieving this result is as follows: The user starts with cassette 224 in the pushed-in position, loaded with a stack of image prints 36 bearing annotation, and with storage element 142 installed. The user cycles through the various image prints until arriving at the image print for which additional annotation is desired. The user activates portfolio recording switch 134 and records a message relevant to the displayed image print. When the recording has been completed, controller 23 stores the audio data into storage element 142, along with an image checksum, which is used to associate the audio message with the particular image print being displayed. This process can be repeated for any number of image prints. During playback when an image print is displayed in viewing aperture 26, controller 23 plays back the annotated audio encoded on the back surface 46 of the image print. At the same time, controller 23 generates an image checksum and searches storage element 142 for an identical image checksum. If an identical image checksum is found, controller 23 retrieves the associated portfolio message for playback after playback of the annotation for the image print. If an identical image checksum is not found, no further action is taken as there is no portfolio message associated with the displayed image print. Those skilled in the art will understand and appreciate that other methods of achieving this result are possible.

Even though storage element 142 has been described as releasably detachable, for manufacturing cost reasons, storage element 142 may also be non-removably embedded into cassette 224. In such case, each cassette may also have an unique identification number embedded within storage element 142 during the manufacturing process. This then becomes yet another method for identifying different cassettes 224.

One of the main problems with photographic image prints is that they often remain sitting in shoe boxes or stashed in drawers because: A) there has been no practical method of organizing and displaying these photos other than using traditional photo albums which are time consuming to organize, bulky to carry, and take up a lot of storage space; and B) there has been no easy way of annotating photos other than hand writing some notes on the back of the photos.

The image and portfolio annotation system described herein advantageously allows users to organize and categorize their collections of photos into small and easily retrievable portfolios. In addition, an overview voice annotation for each portfolio offers users greater enjoyment and comprehension.

Thus, the reader will appreciate that the above-described method and apparatus for annotating image prints and portfolios are convenient, efficient, economical and reliable. The resulting annotation will last as long as the image prints themselves and will not degrade over time or with use, nor will they be susceptible to accidental erasure. The capability of including audio annotation, integral with the image print, greatly improves the documentation, story telling, and memory stimulation features of image prints, thus enhancing the primary purposes of still image photography. Both old and new photographic prints may be annotated without the need to purchase elaborate and expensive equipment.

While not economically feasible at the present time, those skilled in the art will be aware that recent advancements in optical technology, such as those used in CD-ROM, DVD, etc., promise a much higher data density and capacity, which may be used in the present invention for storing data. Holographic data storage is another promising optical technology. For example, holographic materials known as a photopolymers, developed at Du Pont™, have been used in experiments to store 1,000 pages of bit patterns in a polymer film 100 microns thick. Once techniques for reading and writing this data have been fully developed and miniaturized, voice and other data could be stored in a photopolymer film and applied directly to the back of the image prints like a label. A display apparatus, similar to the display apparatus described herein, could then be used to display the image prints and scan and playback the associated data stored in the photopolymer film.

The above is a detailed description of particular preferred embodiments of the invention. Those with skill in the art should, in light of the present disclosure, appreciate that obvious modifications of the embodiments disclosed herein can be made without departing from the spirit and scope of the invention. All of the embodiments disclosed and claimed herein can be made and executed without undue experimentation in light of the present disclosure. The full scope of the invention is set out in the claims that follow and their equivalents. Accordingly, the claims and specification should not be construed to unduly narrow the fill scope of protection to which the present invention is entitled.

What is claimed is:

1. A display apparatus including display means for holding a plurality of stacked image prints and for displaying the image prints successively in a viewing aperture, and advance means for sequentially advancing the image prints one at a time to said viewing aperture, comprising:

scanning means adapted for scanning a machine-readable data on a back surface of a bottom-most one of the plurality of stacked image prints, wherein said machine-readable data is a two-dimensional encodement integral to said back surface of said bottom-most image print and comprises narrative information descriptive of said bottom-most image print;

decoding means adapted for decoding said machine-readable data wherein said machine-readable data comprises at least one of audio data, machine data and text data; storage means adapted for storing decoded machine-readable data, said storage means comprising a first storage area for storing a decoded machine-readable data corresponding to said bottom-most scanned image print and a second storage area;

data moving means for moving said decoded machine-readable data corresponding to said bottom-most scanned image print from said first storage area into said second storage area when said bottom-most scanned image print is advanced for display at said viewing aperture; and playback means adapted for playing back from said second storage area said decoded machine-readable data stored therein, whereby said display apparatus is convenient for both displaying image prints and for playing back said corresponding decoded machine-readable data.

2. An apparatus according to claim 1, wherein said scanning means is an image sensor.

3. An apparatus according to claim 1, wherein said storage means is a nonvolatile storage element.

4. An apparatus according to claim 1, further including a voice synthesis means for synthesizing speech from said machine-readable data.

5. An apparatus according to claim 1, further including a transfer means for transferring said machine-readable data to an external device.

6. An apparatus according to claim 1, further including input means for accepting user input from a touch screen.

7. An apparatus according to claim 1, further including output means for outputting said decoded machine-readable data for display on an electronic display device.

8. A display apparatus according to claim 1, wherein said scanning means is further adapted for scanning a handwritten indicia on a back surface of at least one of the plurality of stacked image prints;

wherein said decoding means is further adapted for detecting and decoding said scanned handwritten indicia wherein said handwritten indicia contains identification information unique to said at least one of the plurality of stacked image prints;

wherein said storage means is further adapted for storing an image print audio recording corresponding to said at least one of the plurality of stacked image prints at an unique storage location uniquely associated with said identification information;

wherein said display apparatus includes a determining means to determine if said unique storage location contains a stored audio data;

wherein said display apparatus further comprises a recording means for making and storing said image print audio recording corresponding to said at least one of the plurality of stacked image prints at said unique storage location when said at least one of the plurality of stacked image prints is displayed at said viewing aperture and when said unique storage location is determined to contain no said stored audio data;

wherein said playback means is further adapted for playing back from said unique storage location said image print audio recording corresponding to said at least one of the plurality of stacked image prints when said at least one of the plurality of stacked image prints is displayed at said viewing aperture, whereby said handwritten indicia provides a means to correspond said at least one of the plurality of stacked image prints with said corresponding image print audio recording, and whereby said display apparatus is convenient for both displaying image prints and playing back audio associated with said image prints.

9. An apparatus according to claim 8, wherein said decoding means is adapted for optical character recognition processing.

10. An apparatus according to claim 8, wherein said storage means is a nonvolatile storage element releasably attached to said display apparatus.

11. An apparatus according to claim 8, further including a voice synthesis means adapted for synthesizing speech from said handwritten indicia.

12. An apparatus according to claim 8, further including a transfer means adapted for transferring said image print audio recording to an external device.

13. A method for sequentially displaying a stack of image prints in a display apparatus, comprising the steps of:

placing said stack of image prints into said display apparatus;

scanning a machine-readable data from a back surface of a bottom-most stacked image print wherein said machine-readable data is a two-dimensional encodement of narrative information descriptive of said bottom-most stacked image print comprising at least one of audio data, machine data and text data, and wherein said machine-readable data is integral to said back surface of said bottom-most stacked image print;

decoding said scanned machine-readable data corresponding to said bottom-most stacked image print and storing said decoded machine-readable data corresponding to said bottom-most stacked image print in a first storage area of a storage means;

advancing said bottom-most stacked image print to a top-most position of the stack and into a viewing aperture;

moving said decoded machine-readable data corresponding to said bottom-most stacked image print from said first storage area to a second storage area of said storage means; and playing back said decoded machine-readable data stored in said second storage area, whereby said display apparatus is convenient for both displaying image prints and playing back said machine-readable data associated with said image prints.

14. A method as claimed in claim 13, wherein said display apparatus comprises a frame housing which retains said bottom-most stacked image print, and a sliding drawer for retaining the remainder of said stacked image prints, said sliding drawer slidable within said frame housing between a first fully-in position and a second fully-out position, and comprising the further steps of:

moving said sliding drawer from said fully-in position to said fully-out position thereby causing said bottom-most image print to advance into said viewing aperture;

moving said sliding drawer from said fully-out position back to said fully-in position thereby causing the remainder of the stacked image prints to be positioned below said bottom-most image print and causing said bottom-most image print to be moved to said top-most position of the stack of image prints, and simultaneously scanning said machine readable data on a succeeding bottom-most image print for decoding and storing in said storage means;

the movement of said sliding drawer from said fully-in position to said fully-out position and back to said fully-in position causing said display apparatus to lay back said decoded machine-readable data stored in said storage means corresponding to said top-most image print displayed in said viewing aperture, whereby said display apparatus cyclically rearranges said stack of image prints within said display apparatus.

15. A method as claimed in claim 13, wherein said display apparatus further includes a touch screen disposed at said viewing aperture, said touch screen providing a touch input means for a user to interact with said top-most image print displayed in said viewing aperture.

16. A method as claimed in claim 13, wherein said display apparatus further includes an electronic display device providing an output means to electronically display visual information to a user.

17. A method as claimed in claim 13, including the further steps of:

scanning a handwritten indicia on a back surface of at least one of the stacked image prints;

detecting and decoding said scanned handwritten indicia, wherein said handwritten indicia contains identification information unique to said at least one of the stacked image prints;

advancing said at least one stacked image prints to said top-most position of the stack and into said viewing aperture;

checking said storage means at an unique storage location uniquely associated with said identification information corresponding to said at least one of the stacked image prints to determine if said unique storage location contains a stored audio data;

recording and storing an image print audio recording corresponding to said at least one of the stacked image prints at said unique storage location when said at least one of the stacked image prints is advanced into said viewing aperture and when said unique storage location is determined to contain no said stored audio data;

playing back from said unique storage location said image print audio recording corresponding to said at least one of the stacked image prints when said at least one of the stacked image prints is advanced into said viewing aperture, whereby said handwritten indicia provides a means to correspond said at least one of the stacked image prints with said corresponding image print audio recording, and whereby said display apparatus is convenient for both displaying image prints and playing back audio associated with said image prints.

18. A method as claimed in claim 17, wherein said display apparatus comprises a frame housing which retains said bottom-most stacked image print and a sliding drawer for retaining the remainder of said stacked image prints, said sliding drawer slidable within said frame housing between a first fully-in position and a second fully-out position, and comprising the further steps of:

moving said sliding drawer from said fully-in position to said fully-out position, thereby causing said bottom-most image print to advance into said viewing aperture;

moving said sliding drawer from said fully-out position back to said fully-in position thereby causing the remainder of the stacked image prints to be positioned below said bottom most image print and causing said bottom-most image print to be moved to a top-most position of the stack of image prints, and simultaneously scanning said handwritten indicia on a succeeding bottom-most image print for decoding and storing in said storage means;

the movement of said sliding drawer from said fully-in position to said fully-out position and back to said fully-in position causing said display apparatus to play back said recorded audio stored in said storage means corresponding to said top-most image print displayed in said viewing aperture, whereby said display apparatus cyclically rearranges said stack of image prints within said display apparatus.

19. A method as claimed in claim 13, wherein said machine-readable data is made integral to said back surface of said bottom-most stacked image print by a method comprising the steps of:

making an audio recording corresponding to said bottom-most stacked image print using a recording device;

converting said audio recording into said machine-readable data using an algorithmic encoding process, wherein said machine-readable data is a two-dimensional encodement format; and printing said machine-readable data using a printing device and integrating said machine-readable data with said back surface of said bottom-most stacked image print, whereby said audio recording is made integral to said bottom-most stacked image print.

20. A method as claimed in claim 17, including the further steps of:

outputting from said display apparatus a recorded audio corresponding to at least one of said stacked image prints;

converting said at least one audio recording into a machine-readable data using an algorithmic encoding process, wherein said machine-readable data is a two-dimensional encodement format;

printing said machine-readable data using a printing device and integrating said machine-readable data with a back surface of said at least one corresponding image print, whereby said audio recording is made integral to said at least one corresponding image print.

21. An annotation and display apparatus, comprising:

display means for holding a plurality of image prints and for displaying said image prints successively in a viewing aperture;

advance means for sequentially advancing said image prints one at a time to said viewing aperture;

recording means for recording an audio message corresponding to at least one of said image prints;

encoding means for encoding said recorded audio message into a machine readable data;

imprinting means for imprinting said machine-readable data and integrating said machine-readable data on a back surface of said at least one image print;

scanning means for scanning said machine-readable data integral on the back surface of said at least one image print;

decoding means for decoding said machine-readable data into a decoded audio message corresponding to said at least one image print;

playback means for playing back said decoded audio message when said at least one image print is displayed in said viewing aperture of said display apparatus whereby said display apparatus is convenient for displaying image prints and for imprinting and playing back said corresponding decoded audio messages.

22. An apparatus according to claim 21, wherein said imprinting means prints said machine-readable data directly on the back surface of said at least one image print, or on a label and then affixes said label to the back surface of said at least one image print.

23. An apparatus according to claim 21, wherein said machine readable data is a two-dimensional encodement format.

24. An apparatus according to claim 21, wherein said scanning means is an image sensor.

25. An apparatus according to claim 21, wherein the display apparatus is portable and battery operated.

26. A method of annotating and displaying image prints using a display apparatus comprising the steps of:

recording an audio message corresponding to at least one of said image prints;

encoding said recorded audio message into a machine-readable data;

imprinting said machine-readable data using an imprinter attached to said display apparatus, and integrating said machine-readable data on a back surface of said at least one image print;

scanning said machine-readable data integral on said back surface of said at least one image print;

decoding said machine-readable data into a decoded audio message corresponding to said at least one image print;

displaying said at least one image print in a viewing aperture of said display apparatus; and playing back said decoded audio message corresponding to said displayed image print, whereby said recorded audio message is made integral to the back surface of said at least one image print and is played back while said at least one image print is displayed in said display apparatus.

27. A method according to claim 26, wherein said display apparatus has display means for holding a plurality of said image prints and for displaying said image prints successively in said viewing aperture and advance means for sequentially advancing said image prints one at a time to said viewing aperture.

28. A method according to claim 26, wherein said imprinter prints said machine-readable data directly on the back surface of said at least one image print, or on a label and then affixes said label to the back surface of said at least one image print.

29. A method for combining images with corresponding audio messages and for displaying said images and playing back said corresponding audio messages in a display apparatus comprising the steps of:

capturing at least one said image using a camera, said camera also capable of recording said corresponding audio messages;

using said camera to record at least one said corresponding audio message for said at least one image in a storage medium;

producing an image print from said at least one captured image;

encoding said at least one recorded corresponding audio message stored in said storage medium into a machine-readable data;

imprinting said machine-readable data and integrating said machine-readable data on a back surface of said image print;

scanning said machine-readable data integral on the back surface of said image print;

decoding said machine-readable data into a decoded audio message corresponding to said image print;

displaying said image print in a viewing aperture of said display apparatus; and playing back said decoded audio message corresponding to said displayed image print, whereby said at least one recorded audio message made while capturing said at least one image is made integral to the back surface of said corresponding image print and is played back while said image print is displayed in said display apparatus.

30. A method as claimed in claim 29, wherein said display apparatus has display means for displaying said image prints successively in a viewing aperture, and advance means for sequentially advancing said image prints one at a time to said viewing aperture.

31. A method as claimed in claim 29, wherein said machine readable data is a two-dimensional encodement format.

32. A method as claimed in claim 29, wherein said storage medium is a solid state memory element affixed to a film cartridge or canister used to store said images.

33. A method as claimed in claim 29, wherein said camera is a single-use camera.

34. A method as claimed in claim 29, wherein said camera is a digital camera.

35. A display apparatus including display means for holding a plurality of image prints and for displaying the image prints successively in a viewing aperture, and advance means for sequentially advancing the image prints one at a time to said viewing aperture, comprising:

scanning means for scanning a machine-readable data on a back surface of at least one of the plurality of image prints, said machine-readable data being integral to said back surface of said at least one image print;

decoding means for decoding said machine-readable data wherein said machine-readable data comprises audio data, machine data, or text data; storage means for storing said decoded machine-readable data corresponding to said at least one scanned image print;

playback means for playing back from said storage means said decoded machine-readable data corresponding to said at least one scanned image print when said at least one scanned image print is displayed at said viewing aperture; and output means for outputting said decoded machine-readable data for display on an electronic display device, whereby said display apparatus is convenient for both displaying image prints and for playing back said corresponding decoded machine-readable data.

36. An apparatus according to claim 35, wherein said scanning means is an image sensor.

37. An apparatus according to claim 35, wherein said machine-readable data is a two-dimensional encodement.

38. An apparatus according to claim 35, wherein said storage means is a nonvolatile storage element.

39. An apparatus according to claim 35, further including a voice synthesis means for synthesizing speech from said machine-readable data.

40. An apparatus according to claim 35, further including a transfer means for transferring said machine-readable data to an external device.

41. An apparatus according to claim 35, further including input means for accepting user input from a touch screen.

42. A method for sequentially displaying a stack of image prints in a display apparatus, comprising the steps of:

placing said stack of image prints into said display apparatus;

scanning a machine-readable data from a back surface of a bottom-most stacked image print wherein said machine-readable data comprises audio data, machine data, or text data, and wherein said machine-readable data is integral to said back surface of said bottom-most stacked image print;

decoding said machine-readable data corresponding to said bottom-most stacked image print and storing said decoded machine-readable data corresponding to said bottom-most stacked image print in a storage means;

advancing said bottom-most stacked image print to a top-most position of the stack and into a viewing aperture;

playing back said decoded machine-readable data stored in said storage means corresponding to said top-most stacked image print displayed in said viewing aperture, outputting said decoded machine-readable data from said display device for display on anelectronic display device, whereby said display apparatus is convenient for both displaying image prints and playing back said machine-readable data associated with said image prints.

43. A method as claimed in claim 42, wherein said display apparatus comprises a frame housing which retains said bottom-most stacked image print, and a sliding drawer for retaining the remainder of said stacked image prints, said sliding drawer slidable within said frame housing between a first fully-in position and a second fully-out position, and comprising the further steps of:

moving said sliding drawer from said fully-in position to said fully-out position thereby causing said bottom-most image print to advance into said viewing aperture; moving said sliding drawer from said fully-out position back to said fully-in position thereby causing the remainder of the stacked image prints to be positioned below said bottom-most image print and causing said bottom-most image print to be moved to said top-most position of the stack of image prints, and simultaneously scanning said machine-readable data on a succeeding bottom-most image print for decoding and storing in said storage means;

the movement of said sliding drawer from said fully-in position to said fully-out position and back to said fully-in position causing said display apparatus to play back said decoded machine-readable data stored in said storage means corresponding to said top-most image print displayed in said viewing aperture, whereby said display apparatus cyclically rearranges said stack of image prints within said display apparatus.

44. A method as claimed in claim 42, wherein said display apparatus further includes a touch screen disposed at said viewing aperture, said touch screen providing a touch input means for a user to interact with said top-most image print displayed in said viewing aperture.

45. A method as claimed in claim 42, wherein said machine-readable data is made integral to said back surface of said bottom-most stacked image print by a method comprising the steps of:

making an audio recording corresponding to said bottom-most stacked image print using a recording device;

converting said audio recording into said machine-readable data using an algorithmic encoding process, wherein said machine-readable data is a two-dimensional encodement format; and printing said machine-readable data using a printing device and integrating said machine readable data with said back surface of said bottom-most stacked image print, whereby said audio recording is made integral to said bottom-most stacked image print.

* * * * *